(12) United States Patent
Yang

(10) Patent No.: US 12,524,349 B2
(45) Date of Patent: Jan. 13, 2026

(54) SCALABLE CACHE PROCESSING METHOD AND APPARATUS FOR APPLICATION, DEVICE AND MEDIUM

(71) Applicants: Cong Lu, Hubei (CN); Zheng Yang, Hubei (CN)

(72) Inventor: Zheng Yang, Hubei (CN)

( * ) Notice: Subject to any disclaimer, the term of this patent is extended or adjusted under 35 U.S.C. 154(b) by 0 days.

(21) Appl. No.: 18/859,350

(22) PCT Filed: Nov. 8, 2022

(86) PCT No.: PCT/CN2022/130596
§ 371 (c)(1),
(2) Date: Oct. 23, 2024

(87) PCT Pub. No.: WO2023/226314
PCT Pub. Date: Nov. 30, 2023

(65) Prior Publication Data
US 2025/0284643 A1  Sep. 11, 2025

(30) Foreign Application Priority Data

May 23, 2022 (CN) .......................... 202210562146.X

(51) Int. Cl.
*G06F 12/08* (2016.01)
*G06F 12/0866* (2016.01)
(Continued)

(52) U.S. Cl.
CPC ...... *G06F 12/0891* (2013.01); *G06F 12/0866* (2013.01); *G06F 12/0897* (2013.01); *G06F 2212/1044* (2013.01)

(58) Field of Classification Search
CPC ............. G06F 12/0891; G06F 12/0866; G06F 12/0897; G06F 9/44505; G06F 2212/1024;
(Continued)

(56) References Cited

U.S. PATENT DOCUMENTS

2014/0337986 A1* 11/2014 Niitani .................... G06F 21/10
726/26
2016/0335191 A1* 11/2016 Dong .................. G06F 12/0891
(Continued)

FOREIGN PATENT DOCUMENTS

| CN | 101452402 A | 6/2009 |
| CN | 106844032 A | 6/2017 |

(Continued)

OTHER PUBLICATIONS

International Search Report for Application No. PCT/CN2022/130596, mail Feb. 14, 2023 (4 pages).
(Continued)

*Primary Examiner* — Tracy C Chan
(74) *Attorney, Agent, or Firm* — NIXON PEABODY LLP; Jeffrey L. Costellia

(57) ABSTRACT

A scalable cache processing method for an application includes: launching a target application based on a launching operation package of the target application, and initializing a plurality of cache components corresponding to the target application, wherein each of the plurality of cache components corresponds to a storage medium, and the storage medium stores data that supports operation of the target application; in response to a storage space release event on a terminal, cleaning data in a local storage medium of the terminal through a corresponding cache component, wherein all data retained in the local storage medium after cleaning is at least data in the launching operation package; and in response to a read request of the target application, acquiring data corresponding to the read request from a cloud storage medium and/or the local storage medium through the corresponding cache component, to support the operation of the target application.

20 Claims, 3 Drawing Sheets

```
launching a target application based on a launching operation package of the target
application, and initializing a plurality of cache components corresponding to the target     S301
application, wherein each of the plurality of cache components corresponds to a storage
medium, and the storage medium stores data that supports operation of the target application

↓ in response to a storage space release event on a terminal, cleaning data in a local storage
medium of the terminal through a corresponding cache component, wherein all data retained     S302
in the local storage medium after cleaning is at least data in the launching operation
package, to ensure that the target application is capable to be launched successfully

↓ in response to a read request of the target application, acquiring data corresponding to the
read request from a cloud storage medium and/or retained data on the local storage medium     S303
through the corresponding cache component, to support the operation of the target
application, wherein the cloud storage medium stores all original data that supports the
operation of the target application
```

(51) Int. Cl.
*G06F 12/0891* (2016.01)
*G06F 12/0897* (2016.01)

(58) Field of Classification Search
CPC ....... G06F 2212/1044; G06F 2212/604; G06F 2212/608; G06F 2212/69; G06F 2201/81; G06F 2201/885
See application file for complete search history.

(56) References Cited

U.S. PATENT DOCUMENTS

2016/0350296 A1* 12/2016 Li .................. G06F 9/5022
2017/0147491 A1* 5/2017 Deguchi ............. G06F 12/0806
2019/0339885 A1* 11/2019 Yanagihara ............ G06N 3/045

FOREIGN PATENT DOCUMENTS

| CN | 108089890 A | 5/2018 |
| CN | 113392041 A | 9/2021 |
| CN | 115048149 A | 9/2022 |
| WO | 2018120705 A1 | 7/2018 |

OTHER PUBLICATIONS

Chinese Office Action in Chinese Patent Application No. 202210562146.x dated Oct. 24, 2025, with English Translation (15 pages).

* cited by examiner

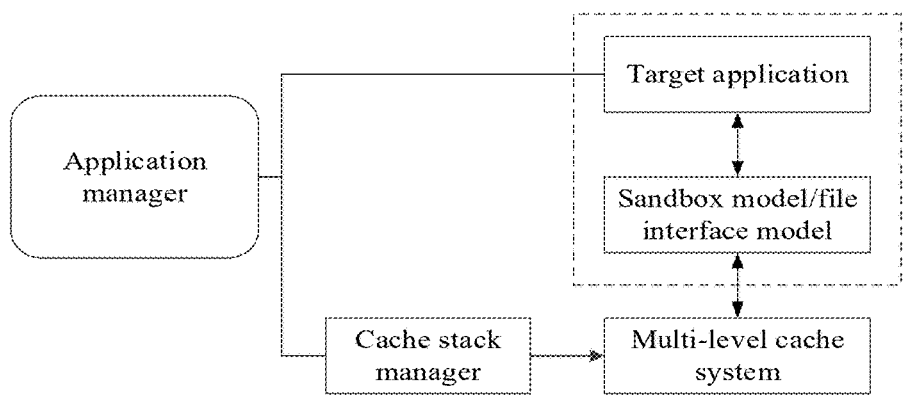

FIG. 2b

| launching a target application based on a launching operation package of the target application, and initializing a plurality of cache components corresponding to the target application, wherein each of the plurality of cache components corresponds to a storage medium, and the storage medium stores data that supports operation of the target application | S301 |

↓

| in response to a storage space release event on a terminal, cleaning data in a local storage medium of the terminal through a corresponding cache component, wherein all data retained in the local storage medium after cleaning is at least data in the launching operation package, to ensure that the target application is capable to be launched successfully | S302 |

↓

| in response to a read request of the target application, acquiring data corresponding to the read request from a cloud storage medium and/or retained data on the local storage medium through the corresponding cache component, to support the operation of the target application, wherein the cloud storage medium stores all original data that supports the operation of the target application | S303 |

FIG. 3

| determining a plurality of pre-read data blocks to be read next time based on data read by a plurality of historical read requests of the target application | S401 |

↓

| for target data blocks not exist in the storage medium corresponding to the cache component with a highest response priority level among the plurality of pre-read data blocks, reading the target data blocks through remaining cache components from the corresponding storage medium in order of the response priority levels from high to low | S402 |

↓

| writing read target data blocks into the storage medium corresponding to the cache component with the highest response priority level, so that when a next read request hits the plurality of pre-read data blocks, the plurality of pre-read data blocks are read from the storage medium corresponding to the cache component with the highest response priority level | S403 |

FIG. 4

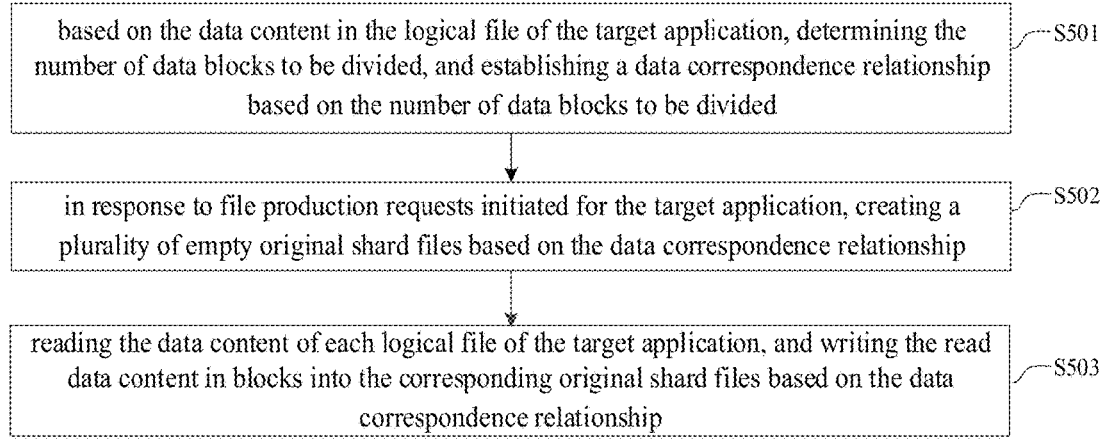
FIG. 5
| dblkid | nodeid | blockid | nodeid | parentid | lnkcnt | ctime | atime | mtime | validsize | allocsize |
|---|---|---|---|---|---|---|---|---|---|---|
| 0 | 4 | 0 | 2 | 1 | 1 | **** | **** | **** | 16384 | 16384 |
| 1 | 5 | 0 | 3 | 2 | 1 | **** | **** | **** | 0 | 0 |
FIG. 6
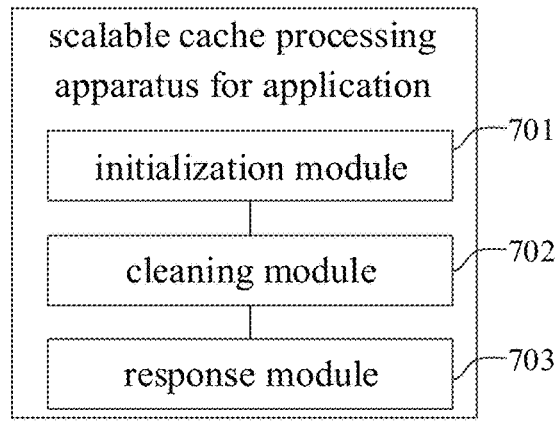
FIG. 7

SCALABLE CACHE PROCESSING METHOD AND APPARATUS FOR APPLICATION, DEVICE AND MEDIUM

The present disclosure claims the priority of the Chinese patent application filed on May 23, 2022 before the China National Intellectual Property administration with the application number of 202210562146.X and the title of "SCALABLE CACHE PROCESSING METHOD AND APPARATUS FOR APPLICATION, DEVICE AND MEDIUM", which is incorporated herein in its entirety by reference.

TECHNICAL FIELD

The present disclosure relates to the technical field of communication processing, and more particularly to a scalable cache processing method and apparatus for an application, a device and a medium.

BACKGROUND

At present, with the popularity of various applications, users generally download various applications on their terminals for use, such as installing many apps on their mobile phones.

However, the storage capacity of the terminal is limited, and complete application data needs to be downloaded when installing applications. Some applications have large application data, which occupies more storage space, thus making it impossible for the terminal to install more applications. And in the process of using the application, a lot of data will gradually accumulate, therefore, the amount of data will gradually increase with the use of the application, resulting in the storage space of the terminal becoming smaller and smaller.

In practice, users often perform data cleaning on the terminals in order to enable them to install more applications or store more data. In related art, when performing data cleaning, the data cleaning is limited, and it cannot release a larger storage space. Cleaning a large amount of data may affect the normal use of the applications, and even if more data needs to be cleaned, the applications must be uninstalled. However, the users often do not want to uninstall the applications.

Therefore, how to release more space for the terminals while retaining numerous applications and not affecting normal use of applications by users is currently a pain point faced by the terminal technology.

SUMMARY

In view of the above problems, the embodiment of the present disclosure is proposed to overcome or at least partially solve the above problems.

In order to solve the above problems, in a first aspect, the present disclosure provides a scalable cache processing method for an application, including:
 launching a target application based on a launching operation package of the target application, and initializing a plurality of cache components corresponding to the target application, wherein each of the plurality of cache components corresponds to a storage medium, and the storage medium stores data that supports operation of the target application;
 in response to a storage space release event on a terminal, cleaning data in a local storage medium of the terminal through a corresponding cache component, wherein all data retained in the local storage medium after cleaning is at least data in the launching operation package, to at least ensure that the target application is capable to be launched successfully; and
 in response to a read request of the target application, acquiring data corresponding to the read request from a cloud storage medium and/or the local storage medium through the corresponding cache component, to support the operation of the target application, wherein the cloud storage medium stores original data that supports the operation of the target application.

Optionally, in response to the storage space release event on the terminal, cleaning the data in the local storage medium of the terminal through the corresponding cache component, includes:
 when the storage space release event is a partially cleaned event, cleaning data to be cleaned in the local storage medium, wherein the data to be cleaned is data determined based on a reading frequency and/or a most recent reading time; and
 when the storage space release event is an extreme cleaned event, cleaning all data in the local storage medium except for the launching operation package.

Optionally, each of the plurality of cache components has a response priority level, when the storage space release event is a partially cleaned event, the method further includes:
 when the local storage medium includes an internal memory, writing data cleaned from the internal memory to a corresponding local storage medium with the response priority level lower than the internal memory; and
 for other local storage media except for the internal memory, writing data with a target feature cleaned from the other local storage media to an incremental data area, wherein the target feature represents that a data block is the data written by the target application.

Optionally, initializing the plurality of cache components corresponding to the target application includes:
 acquiring a performance configuration parameter of the terminal, wherein the performance configuration parameter includes a version identifier of an operating system of the terminal and/or a current performance configuration parameter of an internal memory of the terminal; and
 initializing the plurality of cache components based on the performance configuration parameter, wherein a number of the plurality of cache components is adapted to the performance configuration parameter.

Optionally, initializing the plurality of cache components based on the performance configuration parameter includes:
 when it is determined that the internal memory and/or the operating system of the terminal satisfy a target condition based on the performance configuration parameter, initializing cache components respectively corresponding to a plurality of external memories and the internal memory of the terminal; and
 when it is determined that the internal memory and/or the operating system of the terminal do not satisfy the target condition based on the performance configuration parameter, initializing the cache components respectively corresponding to the plurality of external memories.

Optionally, the method further includes:

acquiring an operating system parameter of the terminal, wherein the operating system parameter is used for indicating an operating system version on the terminal; and based on the operating system parameter, creating an interface layer corresponding to the target application, wherein the interface layer includes a file system model, a sandbox model or a file interface model;

wherein the interface layer is used for receiving an input/output (I/O) request sent by the target application and the storage space release event.

Optionally, each of the plurality of cache components has a response priority level, the cache component with a higher response priority level corresponds to the storage medium with a faster response speed, and the method further includes at least one of followings:

in response to a write request of the target application, writing data to be written to a corresponding storage medium in order of the response priority levels of the plurality of cache components from high to low;

in response to the read request of the target application, acquiring data corresponding to the read request from the corresponding storage medium through the cache component in order of the response priority levels of the plurality of cache components from high to low; and writing data read from the storage medium corresponding to the cache component with a low response priority level to the storage medium corresponding to the cache component with a high response priority level.

Optionally, writing the data to be written to the corresponding storage medium in order of the response priority levels of the plurality of cache components from high to low includes:

in order of the response priority levels from high to low, writing the data to be written to the storage medium corresponding to the cache component with a highest response priority level through the cache component with the highest response priority level; and reading the data to be written from the storage medium corresponding to the cache component with the highest response priority level, and writing the data to be written to the corresponding storage medium through the cache component with the low response priority level.

Optionally, each storage medium stores the data that supports the operation of the target application at granularity of a data block, the data block is obtained by dividing original data of the target application into slices of specific size, and the method further includes:

in response to the read request of the target application, reading the data block required by the read request from a corresponding storage medium in order of the response priority levels of the plurality of cache components from high to low; and encapsulating all data blocks read and returning to the target application.

Optionally, each storage medium stores the data that supports the operation of the target application at granularity of a data block, the data block is obtained by dividing original data of the target application into slices of specific size, and the method further includes:

determining a plurality of pre-read data blocks to be read next time based on data read by a plurality of historical read requests of the target application;

for target data blocks not exist in the storage medium corresponding to the cache component with a highest response priority level among the plurality of pre-read data blocks, reading the target data blocks through remaining cache components from the corresponding storage medium in order of the response priority levels from high to low; and writing the target data blocks read through remaining cache components into the storage medium corresponding to the cache component with the highest response priority level, so that when a next read request hits the plurality of pre-read data blocks, the plurality of pre-read data blocks are read from the storage medium corresponding to the cache component with the highest response priority level.

Optionally, in response to the read request of the target application, reading the data block required by the read request from the corresponding storage medium in order of the response priority levels of the plurality of cache components from high to low, includes:

in response to the read request of the target application, determining a block unique identifier of each data block required by the read request based on a data correspondence relationship, wherein the data correspondence relationship is used for representing a correspondence relationship between the original data and the data block in the storage medium; and reading a data block with the block unique identifier from the corresponding storage medium in order of the response priority levels of the plurality of cache components from high to low.

Optionally, before launching the target application based on the launching operation package of the target application, the method further includes:

for all data blocks obtained by dividing the original data of the target application into slices of specific size, dividing all the data blocks to obtain a plurality of original shard files; and uploading the plurality of original shard files and the launching operation package to the cloud storage medium for the target application to download and use.

Optionally, the method further includes:

creating a plurality of interface components between the cache component and the cloud storage medium that correspond, wherein the plurality of interface components includes in order of response priority levels from high to low: a content delivery network CDN interface component, a peer-to-peer transmission P2P interface component and a source station interface component; and when reading data from the cloud storage medium, acquiring corresponding data from the cloud storage medium through the plurality of interface components in order of the response priority levels of the plurality of interface components from high to low.

In a second aspect, the embodiment of the present disclosure provides a scalable cache processing apparatus for an application, and the apparatus includes:

an initialization module configured for launching a target application based on a launching operation package of the target application, and initializing a plurality of cache components corresponding to the target application, wherein each of the plurality of cache components corresponds to a storage medium, and the storage medium stores data that supports operation of the target application;

a cleaning module configured for, in response to a storage space release event on a terminal, cleaning data in a local storage medium of the terminal through a corresponding cache component, wherein all data retained in the local storage medium after cleaning is at least data in the launching operation package, to at least ensure that the target application is launched successfully; and a response module configured for, in response to a read request of the target application, acquiring data corresponding to the read request from a cloud storage medium and/or the local storage medium through the corresponding cache component, to support the operation of the target application, wherein the cloud storage medium stores original data that supports the operation of the target application.

The embodiment of the present disclosure further discloses an electronic device, including a memory, a processor, and a computer program stored on the memory and executable on the processor, wherein the processor, when executed, implements a scalable cache processing method for the application according to the first aspect.

The embodiment of the present disclosure further discloses a computer-readable storage medium, storing a computer program which enables a processor to execute a scalable cache processing method for the application according to the first aspect.

The embodiment of the present disclosure further discloses a computer program product, including a computer program/instruction that, when executed by a processor, implements a scalable cache processing method for the application according to the first aspect.

Using the scalable cache processing method for the application in the embodiments of the present disclosure can start the target application based on the launching operation package of the target application, and initialize the plurality of cache components. Since each cache component corresponds to its own storage medium, when it needs to release the storage space of the terminal, the data in the local storage medium on the terminal can be cleaned through the corresponding cache component. During the cleaning process, all the data retained in the local storage medium of the terminal is at least the data in the launching operation package. In this way, when only the data in the launching operation package remains on the terminal, the normal startup of the target application can be ensured. Afterwards, during the operation of the target application, the corresponding cache components can be used to acquire the data corresponding to the read request from the original data of the cloud storage medium and/or the retained data of the local storage medium, thereby supporting the operation of the target application.

Using the scalable cache processing method for the application in the embodiments of the present disclosure has the following advantages:

on the one hand, when cleaning the data in the local storage medium, it can be cleaned until only the data in the launching operation package remains on the local storage medium of the terminal. Due to the small amount of data in the launching operation package, it occupies very little space on the local storage medium. For example, some target applications have the launching operation package of only tens of kb, which can release more storage space. This allows the terminal to install more applications and store more data, such as multimedia data.

On the other hand, the launching operation package is used to start the target application, which ensures that the target application can be launched successfully on the terminal. When responding to the read request of the target application in the future, the required data can be read from the original data of the cloud storage medium and/or the data retained on the local storage medium. Therefore, the data cleaning does not affect the normal use of the target application.

In summary, using the scalable cache processing method for the application in the present disclosure can release a large amount of space for the terminal to install more applications and store more multimedia data while retaining numerous applications and not affecting the users to use, thereby solving the pain points faced by the terminal technology.

BRIEF DESCRIPTION OF THE DRAWINGS

In order to more clearly illustrate the technical solutions of the embodiments of the present disclosure, the drawings that are required to describe the embodiments of the present disclosure will be briefly described below. Apparently, the drawings that are described below are some embodiments of the present disclosure, and a person skilled in the art can obtain other drawings according to these drawings without paying creative work.

FIG. 2b is a software and hardware environment diagram when an interface layer is a sandbox model/file interface model;

FIG. 3 is a flow chart of steps of a scalable cache processing method for an application according to an embodiment of the present disclosure;

FIG. 4 is a flow chart of steps of data pre-reading according to an embodiment of the present disclosure;

FIG. 5 is a flow chart of steps for producing an original shard file according to an embodiment of the present disclosure;

FIG. 6 is a schematic diagram of an exemplary data block description table according to an embodiment of the present disclosure; and FIG. 7 is a structural block diagram of an application running apparatus based on multi-level cache according to an embodiment of the present disclosure.

DETAILED DESCRIPTION

Figure 1:
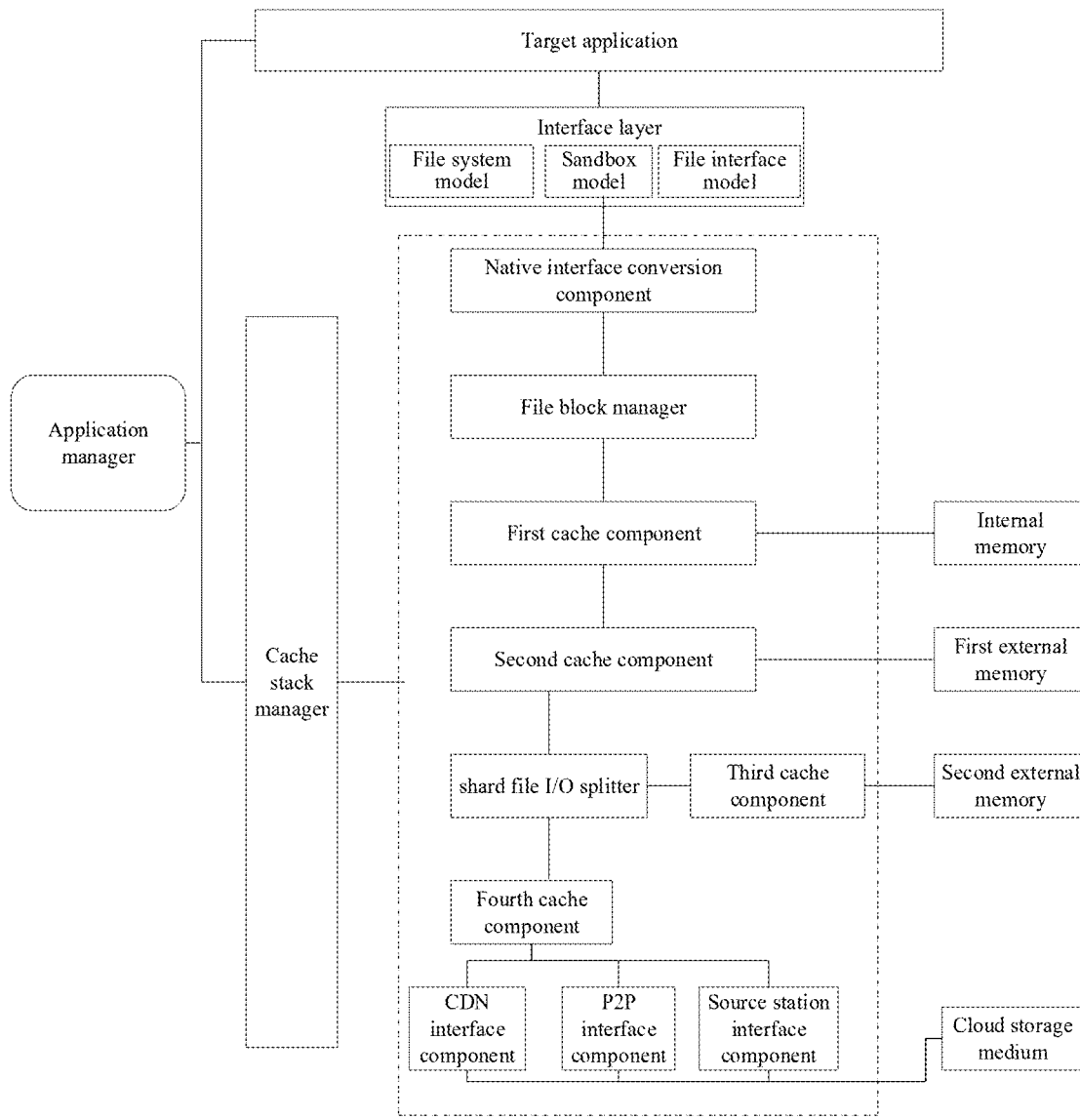
FIG. 1 is a schematic diagram of the software and hardware environment in which a scalable cache processing method for an application is running according to an embodiment of the present disclosure.

The technical solutions according to the embodiments of the present disclosure will be clearly and completely described below with reference to the drawings. Apparently, the described embodiments are merely part of embodiments of the present disclosure, rather than all of the embodiments. All of the other embodiments that a person skilled in the art obtains on the basis of the embodiments of the present disclosure without paying creative work fall within the protection scope of the present disclosure.

The embodiments of the present disclosure can be applied to various operating systems of the terminal, and the terminal includes PC and mobile terminals. The operating systems include PC operating systems such as Windows, Linux, Unix, and virtual machine simulation systems, as well as the operating systems of the mobile terminal such as Android and IOS.

The target application in the embodiments of the present disclosure may refer to applications with large software installation packages and data packages, such as 3D games, PS, and other applications. Among them, the target application can be a PC application or a mobile terminal application (APP). The mobile terminal is taken as an example below, to illustrate the method and system of the embodiments of the present disclosure.

Currently, when installing 3D games, PS and other applications, these applications generally occupy a large storage space on the terminal, making it impossible for the terminal to install more applications. And during the usage process of the application, a lot of data will gradually accumulate, so the amount of data will gradually increase with the use of the application, resulting in the free storage space of the terminal becoming smaller and smaller. Generally speaking, when the users install new applications or need to store large multimedia data (such as images and videos) on the terminal, due to the occupied storage space by the installed applications, the new applications or multimedia data that need to be stored cannot obtain sufficient space, resulting in installation failure or storage failure.

In related art, the users generally clean the data on the terminal in order to have enough space to install new applications or store new data. However, during the data cleaning, the data cleaning is limited, and it cannot release large storage space. For example, when cleaning We-chat data on the mobile phone, only some irrelevant data (such as chat data) can be cleaned. However, the space generally occupied by the chat data is less than the space occupied by the original data that supports the operation of We-chat, but this part of the original data cannot be cleaned. Once cleaned, it will cause We-chat to become unusable. Therefore, the users often abandon the installation of new applications or uninstall some already installed applications, both of which reduce the user experience. Some users often upgrade their terminal devices in order to install more applications, such as purchasing new terminals with larger storage space, buying new phones, or adding storage cards. However, this will inevitably lead to an increase in the purchasing cost for the users.

In view of this, the present disclosure provides a technical solution to solve the above technical problems by thoroughly cleaning data on the terminal without affecting the normal use of the application. To achieve this solution, the inventor first creates the original data of the target application into a launching operation package and a plurality of original shard files. The launching operation package is used to start the target application, and the original shard files store the data required by the operation of the target application. The original shard files can be initially saved in the cloud storage medium for the target application to download and use.

Based on this, the present disclosure can obtain the launching operation package of the target application, start the target application through the launching operation package, and initialize a plurality of cache components corresponding to the target application. Each cache component corresponds to one storage medium. When it needs to clean the data of the terminal, it can be cleaned through the cache components until at least only the data in the launching operation package of the target application remains on the terminal. For the subsequent operation of the target application, the data required by the target application can be read from the original data of the cloud storage medium and/or the data retained in the local storage medium to support the operation of the target application. In this way, the normal operation of the target application can be ensured when the data cleaning is more thorough and more free space is released, providing sufficient storage space for installing new applications and storing new data. The users do not have to uninstall installed applications, nor do they have to purchase new terminals or new storage cards, thus optimizing the user experience and reducing the purchasing cost of the users.

Furthermore, the present disclosure provides the following four improvement points based on the above technical concept:

Improvement point 1: the number of a plurality of initialized cache components can be adapted to the performance configuration parameters of the operating system and the storage devices of the terminal. In this way, the number of the cache components can match the performance configuration of the terminal, allowing the number of the cache components to increase or decrease with different performance configurations of the terminal, thereby achieving scalability of the cache components to flexibly adapt to a plurality of terminals.

Improvement point 2: while improving the input/output (I/O) response speed of the target application, in order to enhance the stability of the I/O response of the target application, a solution is proposed to store the original data of the target application according by the data blocks, that is, the data of the target application is stored at the granularity of data blocks in the original shard file.

In related art, the data of each logical file of the target application is saved into three types of physical files (an original data file, an incremental data file, and a metadata file (storing the attribute information of the logical file)), thereby obtaining the original mirror-image package of the target application. This enables the original data of the target application to be migrated to the three types of physical files, thereby eliminating the need for parsing the operation environment that the target application depends on and the modular splitting work, greatly reducing labor and time costs. However, each logical file corresponds to the three types of physical files, which multiple-fold increases the number of files in the original mirror-image package. When the target application needs to read or write data, a large number of file handles will be generated, which can easily reach handle number limit of the system and cause the target application to crash abnormally.

Therefore, the present disclosure divides the original data of the target application into slices of specific size and divides all obtained data blocks into a plurality of original shard files, thereby storing the original data at the granularity of data blocks. In this way, the original data of a plurality of logical files of the target application is reallocated to the plurality of original shard files. This allows for reading and writing corresponding data blocks from the corresponding original shard files when reading and writing data, avoiding the generation of a large number of file handles and improving the stability of I/O response.

Improvement point 3: the plurality of cache components can have response priority levels, respectively, and can respond to the I/O requests of the target application according to the response priority levels, to reduce the depth of component hierarchy for data access and improve the I/O response speed of the target application.

In the improvement point 3, when the target application sends a read request, it can prioritize reading data from the storage medium with a fast response speed and return it to the target application. When data cannot be read from the storage medium with the fast response speed, the data can be read from the storage medium with a secondary fast response speed and returned to the application. Therefore, when reading data, the data is read from the corresponding storage medium in order of the response speeds from fast to slow, thereby improving the I/O response speed of the target application.

Improvement point 4: in order to further improve the I/O response speed of the target application, the cache component corresponding to the storage medium with the fastest response speed has been improved. This is mainly reflected in predicting the data to be read next time by the target application based on the historical trajectory of data reading by the target application, so as to write the predicted data from other storage media to the storage medium with the fastest response speed in advance, thereby helping to further improve the I/O response speed of the target application.

To fully illustrate the scalable cache processing method for the target application of the present disclosure, the embodiments of the present disclosure are respectively illustrated from the software and hardware environment to which the present disclosure is applied (section 1.1), the scalable processing of multi-level cache (sections 2.1 to 3.1), the specific process of I/O response (section 4.1), and the I/O response based on the original shard file (section 5.1).

1.1, The software and hardware environment to which the present disclosure is applied.

Referring to FIG. 1, a schematic diagram of the software and hardware environment in which the scalable cache processing method of the target application of the present disclosure is applied is shown. Among them, in the software and hardware environment shown in FIG. 1, there are multi-level cache systems (indicated by the dashed box in FIG. 1), interface layers, application managers, and cache stack managers.

Among them, the multi-level cache system includes a native interface conversion component, a file block manager, a first cache component, a second cache component, a third cache component, a fourth cache component, and a shard file I/O splitter. Among them, the shard file I/O splitter is respectively connected to the third cache component and the fourth cache component in communication. Certainly, the number of the cache components may vary depending on different terminals, and FIG. 1 only provides an example of four cache components. It can be understood that in some other cases, there can also be three or more cache components, certainly, the number of the cache components is at least two, that is, including one cache component corresponding to the cloud storage medium and one cache component corresponding to an external memory on the terminal.

Among them, the plurality of cache components can have response priority levels, respectively, and the cache components with higher response priority levels correspond to the storage medium with faster response speeds. Among them, the first cache component, the second cache component, and the third cache component correspond to the local storage media on the terminal, and the fourth cache component corresponds to the cloud storage medium. Partial data of the target application is stored in the local storage medium, while all original data of the target application is stored in the cloud storage medium. As shown in FIG. 1, FIG. 1 exemplarily illustrates that the first cache component corresponds to the internal memory of the terminal, the second cache component corresponds to the first external memory of the terminal, and the third cache component corresponds to the second external memory of the terminal.

Among them, the cache stack manager can be understood as a process that starts and maintains the multi-level cache system. The interface layer can be understood as a communication bridge between the target application and the multi-level cache system, which is used to send data read requests, data write requests, data modification requests, etc. of the target application to the multi-level cache system. The multi-level cache system then responds to the above data read requests, data write requests, data modification requests, and data cleaning requests. The application manager can monitor and maintain the target application and multi-level cache system. Specifically, it can be used to manage the multi-level cache system and the processes of the target application, and maintain communication with them.

As shown in FIG. 1, the interface layer is connected to the native interface conversion component in communication. The native interface conversion component serves as an upper layer component of the file block manager, the file block manager serves as an upper layer component of the first cache component, the first cache component serves as an upper layer component of the second cache component, the second cache component serves as an upper layer component of the shard file I/O splitter, and the shard file I/O splitter serves as an upper layer component of the third cache component and the fourth cache component.

The functions of each component in a multi-level cache system will be illustrated in detail below:

1.1.1, The native interface conversion component. The native interface conversion component is responsible for receiving file I/O requests redirected by the interface layer. It can face different operating systems and is used to accept file I/O interface specifications corresponding to different operating systems, and convert various different file I/O interface specifications into a unified interface specification to interface with the file block manager.

1.1.2, The file block manager. The file block manager is the upper layer component of the plurality of cache components, used to interface with data requests of the target application and manage data in the plurality of original shard files. For example, when the file block manager receives the read request, it can determine the data corresponding to the read request, and then convert the read request into a read request that can be recognizable by the cache component based on the corresponding data, so as to send the read request to the plurality of cache components in order of the response priority levels from high to low, to obtain the corresponding data.

1.1.3, The cache components. Each cache component corresponds to one storage medium, among them, each cache component has its own data pathway with the storage medium. The cache component can manage and maintain the data in the storage medium through its corresponding data path, and respond to the data processing requests to process the data in the storage medium through the corresponding data pathway, such as read processing, write processing, clean processing, etc. Among them, the cache component can establish a pathway in the system with adjacent upper layer component and lower layer component according to the hierarchical relationship between them.

1.1.4, The shard file I/O splitter.

As shown in FIG. 1, the shard file I/O splitter is a lower layer component of the second cache component, and the upper layer component of the third cache component and the fourth cache component, which implements the processing of data in the local storage medium and the cloud storage medium in the terminal. In practice, the complete data of the plurality of original shard files is stored in the cloud storage medium, while the data downloaded from the original shard files to the terminal can be first stored in the local storage medium corresponding to the cache components with lower response priority level on the terminal. Therefore, the data stored in the local storage medium is partial data of the plurality of original shard files. Among them, the shard file I/O splitter can also manage the incremental data area, which stores the data written by the target application.

For example, the original shard files stored in the second external memory corresponding to the third cache component include downloaded partial data, while data stored in the cloud storage medium corresponding to the fourth cache component is the original data of the plurality of original shard files. When the shard file I/O splitter receives the read request from the second cache component, it can read the required data from the storage medium corresponding to the third cache component and/or the fourth cache component, integrate the data read from this storage medium, and return it to the second cache component.

1.1.5, The fourth cache component.

The fourth cache component can actually be called a data combiner, which is a lower layer component of the shard file I/O splitter. When data cannot be successfully read through the first cache component to the third cache component mentioned above, the data combiner can read the data required by the target application from different servers and merge the data read from different servers, then return it to the shard file I/O splitter. Among them, the collection of different servers is referred to as the cloud storage medium in the present disclosure.

In this embodiment, after obtaining the launching operation package, the initialization of each component in the multi-level cache system can be performed through the cache stack manager. The specific introduction is as follows:

1.2, The specific initialization process of the corresponding components in the multi-level cache system.

In specific implementation, the launching operation package and cache stack description files of the target application can be downloaded from the server first. The cache stack description files are used to describe the various components that the target application needs to initialize. After the launching operation package is downloaded completely, the target application can be launched to initialize various components in the multi-level cache system shown in FIG. 1 based on the cache stack description file. For example, the plurality of cache components can be initialized through the launched cache stack manager.

After the initialization of the multi-level cache system is completed, the target application can be run. When running the target application, the interface layer sends the read requests, write requests, and subsequent data cleaning requests issued by the target application to the native interface conversion component. After being converted by the native interface conversion component, it is sent to the file block manager, and the file block manager sends the above requests to the corresponding cache components to execute the above requests.

For example, the interface layer that interfaces with the target application can be created when initializing the native interface conversion component of the target application based on the cache stack description file. Next, a data pathway between the interface layer and the native interface conversion component is established, so that the native interface conversion component can receive data processing requests redirected by the interface layer through this data pathway. And a data path between the native interface conversion component and the file block manager is established, so that the file block manager can receive the redirected data processing requests sent by the native interface conversion component through the corresponding data pathway.

1.3 Initialization of the plurality of cache components (corresponding to the improvement point 1).

In one embodiment, the performance configuration parameters of the terminal can be obtained, and the plurality of cache components can be initialized based on the performance configuration parameters. Among them, the performance configuration parameters include the version identifier of the operating system of the terminal and/or the current performance configuration parameters of the internal memory and external memory on the terminal, and the number of the plurality of cache components adapts to the performance configuration parameters.

In this embodiment, the performance configuration parameters of the terminal can be used to indicate the software and hardware performance status of the terminal, among them, the version identifier of the operating system can be used to indicate the operating system version of the terminal, the operating system can be Android, IOS, Windows, Linux, MacOSX, etc., as well as the operating system corresponding to hardware platforms such as PlayStation, Xbox, Nintendo Switch, etc. Different operating systems can occupy different storage spaces and provide the operating environments with varying performance to the terminals.

Among them, the current performance configuration parameters of the internal memory of the terminal can include: the current remaining capacity of the internal memory of the terminal (some system configurations may use a portion of the internal memory space as supplementary graphics memory for integrated graphics cards, or use a portion of the internal memory space as read/write cache for SSD), the frequency, number of bits, IO response delay, and other parameters of the internal memory. It can reflect the internal memory performance of the terminal, which in turn affects the performance of the terminal running the applications.

In an optional example, before installing the target application on the terminal, the performance configuration parameters of the terminal can be reported to the server where the target application is located through the application manager. The cache stack description files corresponding to different performance configuration parameters are stored in the server in advance, and different cache stack description files are used to guide the initialization of the corresponding number of the cache components on the terminal with the corresponding performance configuration parameters. When downloading and installing the target application, the cache stack description files adapted to the performance configuration parameters of this terminal can be downloaded from the server, and the corresponding number of the cache components can be initialized based on the downloaded cache stack description files.

In another optional example, a standard cache stack description file is stored in the server. When downloading and installing the target application, different terminals can download the cache stack description file from the server. The description items corresponding to the cache components in the cache stack description file can be set to initialize based on the performance configuration parameters of the terminal, and specify the types and numbers of the cache components to be initialized for different performance configuration parameters. In this way, when initializing the cache components, the number and type of the cache components to be initialized can be determined based on the performance configuration parameters of the terminal, and the corresponding number of the cache components can be initialized based on the cache stack description file and the performance configuration parameters.

Among them, the cache components corresponding to the cloud storage medium are necessary. The more cache components means that the more cache components corresponding to the local storage medium on the terminal, that is, the more types of the local storage media that can be used (different types of storage media may have different response speeds). In this way, when responding to the read request of the target application, more local storage media can be used to respond before requesting data from the cloud storage medium. Therefore, the probability of the local storage medium successfully responding to the request of the target application can be increased. Due to the data pathway between the local storage medium of the terminal and the target application is a local pathway of the terminal, and the communication path is short, the response speed to the target application can be improved.

In practice, the local storage medium of the terminal can include the internal memory of the terminal and a plurality of external memories, the plurality of external memories can include solid-state drives, mechanical hard drives, as well as external USB devices, storage cards, etc.

Among them, the better the performance configuration parameter of the terminal representation, the more cache components are initialized, otherwise the opposite case is done.

In specific implementation, when initializing the plurality of cache components based on the performance configuration parameters, it may determine whether the internal memory, external memory, and/or operating system of the terminal meet the target conditions based on the performance configuration parameters. When the target conditions are met, the cache components corresponding to each of the plurality of external memories and the internal memory of the terminal are initialized. The cache components corresponding to the plurality of external memories are initialized when the target conditions are not met.

Among them, the target condition can be any one or a combination of a plurality of conditions, such as the operating system being the target operating system version, the number of CPU instruction set bits of the terminal being the target bit, and the remaining capacity of the internal memory of the terminal not being lower than the target capacity. Among them, the more content included in the target conditions, the higher requirements the performance configuration parameters of the terminal need to meet, so as to initialize a larger number of cache components.

Among them, when the target conditions are met, the initialized cache components include the cache components corresponding to the internal memory, also known as internal memory cache components, and the plurality of external memories on the corresponding terminal can initialize the corresponding cache components, respectively. For example, if the target condition is that the operating system version is Linux, the current remaining capacity of the internal memory is not less than 60%, the CPU instruction set is 64 bits, and there are both the solid-state drives and the mechanical hard drives, then if this condition is met, it indicates that the performance of the terminal is better. Therefore, four cache components can be initialized, such as the internal memory cache component corresponding to the internal memory, the temporary cache component corresponding to the first external memory (solid-state drive) on the terminal, the local cache component corresponding to the second external memory (mechanical hard drive), and the cloud cache component corresponding to the cloud storage medium.

In one example, the cache component corresponding to one of the plurality of external memories can be determined as a temporary cache component that matches the internal memory cache component, where the internal memory cache component is an upper layer component adjacent to the temporary cache component, and the two can be used in combination and both are indispensable. As shown in FIG. 1, the first cache component is the internal memory cache component, and the second cache component is the temporary cache component. Among them, when the data in the internal memory corresponding to the internal memory cache component is cleaned, the cleaned data can be written to the temporary cache component. In this way, when responding to the I/O requests of the target application, the data originally in the internal memory can be read from the temporary cache component. This ensures that the space of the internal memory is not occupied too much and also guarantees the I/O response speed to the target application.

Certainly, it should be noted that a terminal usually installs a plurality of applications, which can be installed at different times. Therefore, as the terminal continuously installs applications, its storage resources are constantly occupied. Therefore, the performance configuration parameters of the terminal may vary at different times. Therefore, the number of the cache components initialized for applications installed at different times can also be different.

For example, for applications with earlier installation times, due to the relatively low utilization rate of the storage resources on the terminal during installing these applications, the remaining capacity of the internal memory of the terminal is relatively high. Therefore, for the applications with earlier installation times, their initialized cache components can include the internal memory cache components and the temporary cache components. For applications with later installation times, the utilization rate of the storage resources on the terminal is relatively higher, and the remaining capacity of the internal memory is relatively lower. Therefore, for the applications with later installation times, their initialized cache components may not include the internal memory cache components and the temporary cache components.

In this way, for the same terminal, the number of the cache components initialized for the applications with different installation times can also be different. This allows the terminal to install as many applications as possible while ensuring the response speed of some applications, achieving full utilization of the storage resources of the terminal.

When adopting this implementation method, the number of the cache components to be initialized can be determined based on the performance configuration parameters of the terminal when initializing the multi-level cache system of the target application. In this way, the number of initialized cache components can be adapted to the operating system version and performance configurations of the internal memory and external memories of the terminal. This means that the terminals with different operating system versions have different numbers of initialized cache components, and the terminals with different storage performance configurations can also have different numbers of initialized cache components. Therefore, the number of the cache components can be scalable relative to different types of terminals, and can also be different relative to the terminals with different installation times, thereby improving the adaptability between the multi-level cache system and the terminals.

Furthermore, since the cache components other than those corresponding to the cloud storage medium (cloud cache components) correspond to the local storage medium of the terminal, when initializing the cache components based on the performance configuration parameters of the terminal, the local storage media used by the multi-level cache systems on different terminals can be different. When the target conditions are met, the internal memory and the plurality of external memories of the terminal are utilized to respond to the target application. When the target conditions are not met, the plurality of external memories of the terminal are utilized to respond to the target application. In this way, suitable storage medium can be used based on the performance configurations of the terminal to fully respond to the target application, achieving full utilization and scheduling of the storage resources of the terminal.

1.4, The initialization of the interface layer.

In one embodiment, the interface layer can be understood as a communication bridge between the target application and the multi-level cache system. The interface layer is used to receive the I/O requests and the storage space release events issued by the target application, that is, to receive the read requests, write requests, and data cleaning requests from the target application. Among them, the interface layer can be a file system model, a sandbox model, or a file interface model.

In practice, in order to fully adapt the multi-level cache system to the operating system of the terminal and improve the portability of the multi-level cache system to different terminals, the type of the corresponding interface layer can be determined based on the operating system parameters of the terminal. In specific implementation, the operating system parameters of the terminal can be obtained, and the interface layer corresponding to the target application can be created based on the operating system parameters.

In this embodiment, the operating system parameters are used to indicate the version of the operating system on the terminal. The operating system parameters can be the version identifier of the operating system. As mentioned above, different operating systems provide different program running environments for the terminal, such as different system architectures, hardware configurations, software layering models, and permission management designs. Therefore, different interface layers need to be implemented. However, different interface layers have varying degrees of invasiveness and development difficulty on the operating system. Therefore, in order to enable multi-level cache systems to achieve stable operation of the target application in the operation environment provided by the operating system through matching interface layers, matching interface layers can be initialized for the terminals with different operating systems.

Among them, in the case where the operating system parameters indicate that the operating system is the corresponding host operating system such as PlayStation, Nintendo Switch, and IOS system, the initialized interface layer can be the file interface model. In the case where the operating system parameters indicate that the operating system is Windows, Linux, Android, or MacOSX, the initialized interface layer can be the file system model. In the case where the operating system parameters indicate that the operating system is the Xbox host operating system, the initialized interface layer can be the sandbox model or the file interface model.

Figure 2A:
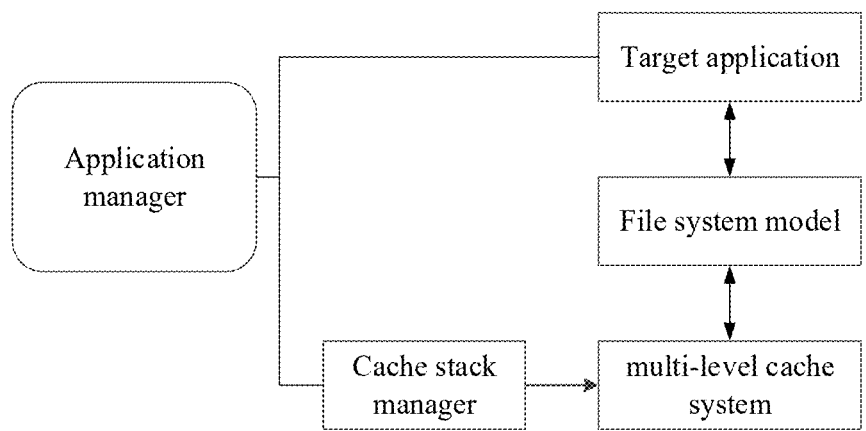
FIG. 2a is a software and hardware environment diagram when an interface layer is a file system model.

Specifically, referring to FIG. 2a and FIG. 2b, FIG. 2a shows the schematic diagram of the software and hardware environment when the interface layer is the file system model, while FIG. 2b shows the schematic diagram of the software and hardware environment when the interface layer is the sandbox model/file interface model.

As shown in FIG. 2a, the file system model is based on kernel file system design architecture and has the advantages of non-hijacking or forced modification of internal memory content in the operating system, no stability issues, and non-invasiveness, high stability, and no code learning and adjustment costs to target applications. Another advantage of the file system model is its ability to take over read and write requests of the Memory-Mapped files. In the related design of the operating systems, the file system model is a kernel implemented component that can take over application file read and write requests as well as File Mapping I/O (initiated by MMU-Internal Memory Manager) requests, while the sandbox model and file interface model are components implemented at the application layer, so only the application file read and write requests can be taken over. Therefore, the file system model is the most adaptable solution for processing application file IO requests.

As shown in FIG. 2b, the sandbox model, is a mechanism for hijacking file access interfaces based on the File Hooking Layer. This mechanism scans the relevant file access interfaces in the internal memory during the initialization of the application process, and then modifies the binary entry code of the file access interface to redirect and modify the original function. The goal of taking over the file read and write requests can be achieved without requiring engineers to pay attention to the file data access libraries and related interfaces that the application depends on, which has the advantages of low code learning and adjustment costs.

Among them, the file interface model is linked and invoked by the application core components (e.g. 3D graphics engine, file compression/decompression library, video codec library, multiple format resource parsing library, etc.). Although there is some code learning and adjustment costs, this approach has the best system portability.

As shown in FIG. 1, a data pathway is established between the interface layer and the native interface conversion component. Through this data pathway, the native interface conversion component can receive a data processing request redirected by the interface layer, the data processing request is sent to the interface layer by the target application running in the operating system. The native interface conversion component is used to convert various file I/O interface specifications into a unified interface specification to interface with the file block manager.

Among them, there is also a data pathway established between the native interface conversion component and the file block manager. Through this data pathway, the file block manager can receive the data processing request converted by the native interface conversion component. As a result, a communication architecture between the multi-level cache system and the target application has been established through the interface layer, the native interface conversion component, and the file block manager, as well as data pathways among them. This has successfully enabled the multi-level cache system to support and respond to the target application.

1.5. The initialization of the cache components corresponding to the cloud storage medium.

As shown in FIG. 1, a plurality of interface components are configured between the cloud storage medium and the corresponding fourth cache component, the plurality of interface components can have their own response priority levels. Different interface components can also have different response speeds, and different interface components can obtain data from the original shard files on the corresponding servers. By setting the plurality of interface components, the probability of the terminal successfully downloading the data of the target application from the cloud storage medium can be increased, thereby ensuring the stable operation of the target application.

During specific implementation, multiple types of interface components can be created between the cache components and the cloud storage medium that correspond. Multiple types of interface components are arranged in order of the response priority levels from high to low, including a content delivery network (CDN) interface component, a peer-to-peer transmission (P2P) interface component, and a source station interface component. In this way, when reading data from the cloud storage medium, corresponding data can be obtained from the cloud storage medium through the multiple types of interface components in order of the response priority levels from high to low. It should be noted that interface components with higher response priority correspond to faster data acquisition speed.

In this embodiment, the cloud storage medium may include a plurality of data sources (such as servers), including CDN (content delivery network) data sources and P2P data sources. Among them, the CDN interface component corresponds to the CDN data sources, and the P2P interface component corresponds to the P2P data sources. The source station interface component corresponds to the storage medium on the initial station that stores the data block of the target application.

The basic principle of CDN is to widely deploy a plurality of cache servers in various regions, distribute these cache servers to areas or network regions with relatively concentrated user access data. When the users access websites, global load technology is used to direct their access requests to the nearest cache server capable to work normally, and this cache server directly responds to user requests. Correspondingly, the CDN interface component can be loaded by the cache stack manager and its interface table can be registered with the cache stack manager through xxx_iTF_uuid.

Among them, P2P data sources are P2P transmission components implemented based on BitTorrent or MagNet communication protocols, which can save download traffic of CDN data sources. When the number of the users who download the application reaches tens of millions or billions, it can save a lot of traffic costs for enterprise users (application store service providers) and improve the stickiness of the enterprise users. The P2P interface component is loaded by the cache stack manager and invokes its initialization interface (ITF_Initialize). The specific process is to initialize the internal data structure and register its interface table with the cache stack manager through xxx_iTF_uuid.

Among them, when acquiring data from the cloud storage medium through multiple types of interface components in order of the response priority levels of the multiple types of interface components from high to low, the response priority level of the CDN interface component is higher than that of the P2P interface component, and the response priority level of the P2P interface component is higher than that of the source station interface component. Therefore, data can be acquired from the original shard file of the CDN data source through the CDN interface component, that is, the data in the original shard file can be acquired from the nearest cache server. If the data is successfully acquired, the data is directly returned to the fourth cache component. If the data is not successfully acquired, corresponding to the data not successfully acquired, a data acquisition request is encapsulated, and the data corresponding to the request is acquired from the original shard file of the P2P data source through the P2P interface component. If the data is successfully acquired, the data is returned to the fourth cache component. If the data is not successfully acquired, corresponding to the data not successfully acquired, another data acquisition request is encapsulated, the remaining data is acquired from the original shard file of the source station (the server that initially stores the original shard file) through the source station interface component. If the remaining data is successfully acquired, the remaining data is returned to the fourth cache component. If the remaining data is not successfully acquired, the fourth cache component can return a message of data read failure, and the target application can initiate a new read request to retry last read request.

In addition, in order to save traffic costs, the response priority level of the P2P interface component can be adjusted to be higher than that of the CDN interface component. Therefore, the process of processing the read requests of the target application based on the response priority level is adjusted to: first attempt to obtain data from the original shard file of the P2P data source, then obtain data from the original shard file of the CDN data source, and finally obtain data from the original shard file of the source station data source. Although adjusting the response priority levels may result in a decrease in the speed of the fourth cache component in processing the read requests, however, attempting to acquire the data from the P2P data sources preferentially can save a significant amount of traffic costs.

When adopting this implementation method, data can be acquired from multiple types of data sources through different interface components, which can maximize fault tolerance (network anomalies) and improve the probability of the terminal successfully downloading the data required by the target application from the cloud storage medium, thereby improving the stability of the I/O response to the target application.

1.6 Monitoring and maintenance of the target applications and the multi-level cache system.

In this embodiment, the target application can be operated in response to the event that the initialization on the multi-level cache system by the cache stack manager is completed. And the processes of the target application and the cache stack manager are monitored. The processes of the target application and the cache stack manager will be terminated when the process of the target application or the process of the cache stack manager are abnormal.

In specific implementation, the application manager can monitor the processes of the target application and the cache stack manager. Specifically, the application manager can establish a monitoring channel with the target application based on PID information (Process Identifier) of the target application, as well as establish a monitoring channel with the cache stack manager based on the PID information of the cache stack manager, to monitor the states of the cache stack manager and the target application.

If either the target application or the cache stack manager is abnormal or crashing, the processes of both will be terminated. When the processes of target application and the cache stack manager are terminated, the configuration of the target application and the state of the data managed by the cache component corresponding to the local storage medium can be restored, thus ensuring overall consistency between the configuration of the target application and the state of the data managed by the cache component corresponding to the local storage medium.

In practice, when the user exits the target application normally, the application manager can notify the cache stack manager to exit normally, and if the cache stack manager still does not exit after waiting for a period of time (loop checking for 30 seconds), the process of cache stack manager can be forcibly terminated through the operating system API (Application Programming Interface).

2.1. Detailed illustration of the scalable cache processing method for the target application Referring to FIG. 3, a flow chart of the scalable cache processing method for the target application of the present disclosure is shown, as shown in FIG. 3, the method can specifically include the following steps:

Step S301: launching a target application based on a launching operation package of the target application, and initializing a plurality of cache components corresponding to the target application.

Among them, each of the plurality of cache components corresponds to a storage medium, and the storage medium stores data that supports operation of the target application. Specifically, the storage medium includes at least the cloud storage medium and the local storage medium of the terminal. The cloud storage medium includes original data that supports the operation of the target application, that is, including all the original data of the target application. The local storage medium includes some or all of the data of the target application, generally including data downloaded from the cloud storage medium, and the downloaded data is usually some of the data of the target application.

In this embodiment, when the target application is not installed, the launching operation package of the target application can be downloaded from the server. Specifically, when the user needs to install the target application on the terminal, the launching operation package can be downloaded from the corresponding server through the application manager. Among them, the launching operation package includes very little data and includes the most basic files for launching the target application. When the target application is launching, the launching operation package detects whether the target application has been registered, configured, and installed in the current system. If it has not been registered, configured, and installed, the basic application registration, installation, and configuration for the target application, and interaction between the target application and the operating system of the terminal are completed during the installation process of the target application. Then, the target application is launched and the plurality of cache components corresponding to the target application are initialized. Otherwise, the target application is directly launched and the plurality of cache components corresponding to the target application are initialized.

Therefore, when the download of the launching operation package is completed, the target application can be launched through the launching operation package. When the target application is launched, the plurality of cache components of the target application can be initialized. The initialization process can refer to section 1.3 above. Specifically, the cache stack description file of the target application can be acquired. In one embodiment, there may be a plurality of cache stack description files, different cache stack description files for terminals with different performance configurations. Therefore, when downloading the launching operation package of the target application, the performance configuration parameters of the terminal can be sent to the server to acquire the cache stack description file adapted to the terminal itself, and then the plurality of cache components can be initialized according to the cache stack description file.

It can be understood that during the initialization of the plurality of cache components, a data pathway can be established between each cache component and its corresponding storage medium to establish a communication connection between the cache component and the storage medium.

Among them, the cache stack description file is used to indicate which components in the multi-level cache system need to be initialized. For example, the "name" field in the cache stack description file represents the name of the current component, and the "type" field represents the type of the current component. The cache stack manager needs to perform a validity check: its value can be "I/O-filter" or "by-path_filter" or "cluster_I/O-filter", which respectively represent "I/O filter", "bypass filter" and "cluster I/O filter".

Among them, "I/O filter" represents that this component is necessary during the data I/O processing, and the "bypass filter" represents that this component is not necessary during the data I/O processing. The "id" field represents the uuid of the current component, and the cache stack manager needs to perform a validity checking: the uuid of the top-level and secondary filter components must be globally unique. The "path" field represents the relative path of the current component. The "components" field only exists in description section for components of the "cluster I/O filter", representing the dependent (secondary) component description of the current cluster component, its structure is a composite array, including the dependent I/O components included in the cluster I/O filter. During the initialization of multi-level cache system, I/O filters of the same level: built from bottom to top, destroyed from top to bottom; I/O filters of different levels: built from the inside out, destroyed from the outside in.

Step S302: in response to a storage space release event on a terminal, cleaning data in a local storage medium of the terminal through a corresponding cache component.

Among them, all data retained in the local storage medium after cleaning is at least data in the launching operation package, to ensure that at least the target application can be launched successfully. Specifically, cleaning includes proportional cleaning and extreme cleaning. In the case of extreme cleaning, all data retained in the local storage medium after cleaning is the data in the launching operation package to ensure that at least the target application can be launched successfully.

In this embodiment, in order to avoid the target application occupying too much storage space on the local storage medium of the terminal, so that the terminal can install more applications and provide faster response speed, this application periodically cleans the data in the local storage medium to release more storage space for the terminal to store data of other applications and/or other multimedia data.

Among them, the storage space release event can be triggered for the terminal. In one example, when the remaining storage capacity of a certain local storage medium is detected to be lower than the target capacity of the local storage medium, the storage space release event for the local storage medium can be triggered. In another example, the storage space release event can also be triggered based on the data cleaning operation of the users, for example, when the user triggers the data cleaning of the target application through UI of the application manager, then the storage space release event is triggered. Among them, the users can specify the local storage medium to be cleaned and also specify the degree of data cleaning. Furthermore, the cache component corresponding to the local storage medium to be cleaned can clean the data in the local storage medium.

In specific implementation, some or all of the data in the local storage medium can be cleaned. For example, as shown in FIG. 1, there are three local storage media, corresponding to the first cache component to the third cache component. When data cleaning is required, the data in the three cache components can be cleaned, or only the data in one or two of the three cache components can be cleaned.

Among them, when cleaning the data stored in the local storage medium, for a local storage medium, all data in the local storage medium can be cleaned, or some data in the local storage medium can be cleaned. Overall, the limit of cleaning can be that all data left in the local storage medium is the data in the launching operation package. That is to say, the data cleaning in the present disclosure includes both the proportional cleaning of data and the extreme cleaning. In the proportional cleaning, the proportion can be specified by the user, while the extreme cleaning refers to the minimum amount of data retained in all local storage media, the minimum amount of data is the data in the launching operation package.

Among them, the launching operation package only includes components for registering and configuring information with the operating system by the applications, startup program components, and multi-level cache system related components, and does not include data from executable components of the application itself or data from resource packages. Therefore, the occupied space in the local storage medium is very small.

For example, as shown in FIG. 1, under this extreme cleaning, all remaining data in the local storage media corresponding to the first cache component to the third cache component is only the data in the launching operation package. In this case, the local storage media corresponding to the first cache component and the second cache component may not include the data of the target application, while the second external memory corresponding to the third cache component only includes the launching operation package. Certainly, it can be that the second external memory does not include the launching operation package, while the first external memory includes the launching operation package.

Due to the small storage space occupied by the data in the launching operation package, it is possible to achieve maximum cleaning of the data of the target application on the terminal. Additionally, since the launching operation package is used to launch the target application and the launching operation package exists in the local storage medium of the terminal corresponding to the second or third cache component, the startup and usage of the target application will work.

Step S303: in response to a read request of the target application, acquiring data corresponding to the read request from a cloud storage medium and/or retained data on the local storage medium through the corresponding cache component, to support the operation of the target application.

Among them, the cloud storage medium stores all original data that supports the operation of the target application.

In this embodiment, after cleaning the data in the local storage medium according to the storage space release event, if a read request from the target application is received, the data corresponding to the read request can be acquired from the local storage medium and/or cloud storage medium to support the normal operation of the target application.

After data cleaning, when all the data retained on the local storage medium includes not only the launching operation package but also other data required by the target application, if there is data corresponding to the read request in the local storage medium, the required data can be read from the local storage medium and returned to the target application. If there is no data corresponding to the read request in the local storage medium, the required data can be read from the cloud storage medium and returned to the target application. If there is partial data corresponding to the read request in the local storage medium, the existing data can be read from the local storage medium first, and then a new read request which is constructed based on the remaining non-existent data will be sent to the cache component corresponding to the cloud storage medium, to acquire the remaining data corresponding to the new read request. Finally, the data acquired from the local storage medium is spliced with the data acquired from the cloud storage medium to form a complete data response corresponding to the read request, which is returned to the target application.

Among them, after data cleaning, if all the data retained on the local storage medium only includes the launching operation package, then when receiving the read request from the target application, the required data can be directly read from the cloud storage medium and returned to the target application.

In any case, the cloud storage medium always stores all the original data required by the target application. As long as the target application can be launched through the launching operation package on the terminal side, the plurality of cache components can ensure that the read requests of the target application are successfully executed to support the operation of the target application.

It should be noted that the above data cleaning can refer to deleting data.

By adopting the technical solution of the embodiment of the present disclosure, on the one hand, when cleaning data in the local storage medium, it can be cleaned until only the data in the launching operation package remains in the local storage medium of the terminal. Due to the small amount of data in the launching operation package, the occupied space in the local storage medium is very small. For example, the launching operation package of some target applications are only a few tens of kb, which can release more storage space, so that the terminal can install more applications, correspondingly, more data will be stored, such as multimedia data. On the other hand, the launching operation package is used to launch the target application, which can ensure that the target application can be launched successfully on the terminal, and when responding to the read request of the target application in the future, the required data can be read from the cloud storage medium and/or the local storage medium. Therefore, data cleaning does not affect the normal use of the target application.

In summary, adopting the scalable cache processing method for the application of the present disclosure can release more space for the terminals to install more applications and store more multimedia data while remaining a plurality of applications and not affecting the usage by the users, thereby solving the pain points faced by the terminal technology.

A detailed explanation will be given below on how to perform data cleaning in the present disclosure.

3.1, The process of data cleaning.

In this embodiment, in order to avoid the target application occupying too much storage space on the storage medium of the terminal, so that the terminal can install more applications and provide faster response speed, the present disclosure periodically cleans data in the local storage medium through the plurality of cache components on the terminal, to release more storage space for the terminal to store data of other applications.

Among them, data cleaning involves two situations: partial cleaning and thorough cleaning. In the case of the partial cleaning, infrequently read data in the local storage medium will be cleaned, while in the case of the thorough cleaning, all data in the local storage medium except for the launching operation package will be cleaned. The two cleaning situations are explained as follows:

3.1.1, The situation of the partial cleaning.

In specific implementation, when the storage space release event is a partially cleaned event, the data to be cleaned in the local storage medium is cleaned, and the data to be cleaned is determined based on the reading frequency and/or the most recent reading time.

In specific implementation, data with the reading frequency less than a target frequency and/or the most recent reading time earlier than a preset reading time in the local storage medium can be cleaned, or data with the reading frequency less than the target frequency and/or the most recent reading time earlier than the preset reading time and meeting the target proportion can be cleaned.

Among them, the target proportion can be a proportion specified by the users, reflecting the proportion of an amount of cleaned data to an amount of the original data. If the target proportion is 40%, it represents that 40% of the data needs to be cleaned. Among them, the users can also specify the local storage medium to be cleaned, such as specifying the internal memory corresponding to the first cache component as the object of data cleaning, and then cleaning the internal memory according to the target proportion. In practice, all local storage media can be cleaned, so that a target proportion can be specified for each local storage medium. Different local storage media can correspond to different target proportions or the same target proportion, thus achieving the cleaning of data of the target applications in each local storage medium.

In one example, it may clean data without following the target proportion. In this case, data with the reading frequency less than the target frequency and/or the most recent reading time earlier than the preset reading time can be cleaned as the data to be cleaned. For example, all data with the reading frequency less than the target frequency can be cleaned, or all data with the most recent reading time earlier than the preset reading time can be cleaned, or all data with the reading frequency less than the target frequency and the most recent reading time earlier than the preset reading time can be cleaned.

In one example, the data in each local storage medium can also be sorted comprehensively by the reading frequency and the most recent reading time. Specifically, corresponding weights can be set for the reading frequency and reading time respectively. Then, according to the reading frequency and reading time of the data and their respective weights, the sorting scores corresponding to each datum can be acquired, and the data can be sorted according to the sorting scores. The data at the top of the sorting can refer to the data that users the read more frequently. In this way, the data of the target proportion can be cleaned from bottom to top according to the sorting. In this way, the data of the target proportion is cleaned according to the reading frequency and reading time.

Among them, the reading frequency can be understood as the number of reads. Taking the cleaning of data in the internal memory as an example, when determining the data to be cleaned in the internal memory, a doubly linked list can be maintained in the internal memory cache component. The header of the doubly linked list stores the data identifier of the "most recently accessed" data, and the tail stores the data identifier of the "longest unvisited" data. When a certain datum is hit by the read request, the data identifier of the corresponding data is taken out from the current position of the doubly linked list and placed in the header of the linked list. In this way, the data identifier closer to the chain header indicates that the data has been accessed more recently. When the internal memory needs to be cleaned, the data corresponding to a plurality of data identifiers in the tail of the linked list can be determined as the data to be cleaned (traversing data blocks from the tail of the linked list to the header of the linked list and counting them, while calculating the proportion with the total number of the data blocks in the linked list), and the proportion of the data to be cleaned to all data in the linked list is the target proportion. If the target proportion is 40%, then 40% of the infrequently accessed data will be cleaned.

Certainly, as mentioned above, it may simultaneously record the number of times each datum is read and the time of each read, and set weights for the number of reads and the reading time separately. For example, the weight for the number of reads is set to 0.8, and the weight for the reading time is set to 0.2. In this way, the focus is on eliminating data with a bias towards the number of reads.

In one embodiment, in the case where the local storage medium includes the internal memory, that is, including an internal memory cache component corresponding to the internal memory and a temporary cache component corresponding to the first external memory, different processing can be performed on the data in the internal memory and other local storage medium during the data cleaning process to ensure the speed of the I/O response of the target application.

During specific implementation, data cleaned from the internal memory can be written to the corresponding local storage medium with a response priority level lower than that of the internal memory. And for the other local storage media except for the internal memory, the data with a target feature cleaned from the other local storage media is written to the incremental data area.

Among them, the target feature represents that the data is data written by the target application, and the incremental data area can be located in the local storage medium with the lowest response priority level.

In this embodiment, the internal memory corresponds to the internal memory cache component, which has the highest response priority level. The lower level component of the internal memory cache component is the temporary cache component, which corresponds to the first external memory on the terminal (the local storage medium with the response priority level lower than that of the internal memory), such as a solid state drive. When the data belonging to the target application in the internal memory is cleaned, the data eliminated from the internal memory can be written to the first external memory. In this case, when the read request of the target application arrives, if the data corresponding to the read request exists in the first external memory, the data can be read out from the first external memory.

Certainly, in the above situation, the first external memory can be a local storage medium that is not subjected to the data cleaning, or it can be a local storage medium that is subjected to the data cleaning. If it is not subjected to the data cleaning, the data eliminated from the internal memory into the first external memory can be left uncleaned, thus ensuring the response speed of the next data read request of the target application. If it is subjected to the data cleaning, the data with the target feature that is eliminated from the internal memory to the first external memory will be written to the incremental data area, thus ensuring that various data configured and archived by the user on the target application will not be lost.

Among them, when performing data cleaning on the other local storage media except for the internal memory, if the cleaned data is written by the target application, this data can be written into the incremental data area. For example, as shown in FIG. 1, the incremental data area can be located in the second external memory, the incremental data area is a data area that will not be cleaned forever. That is to say, the data written by the user will not be cleaned, which can ensure that the data written by the user is not lost due to cleaning, such as ensuring that the graphics, peripherals, gaming related configurations or archives of the users are not lost.

When using this implementation method, data belonging to the target application in one or more local storage media can be cleaned in a targeted manner. The data can be cleaned according to the target proportion, or dynamically cleaned according to the reading frequency and/or the most recent reading time. Therefore, data cleaning can be achieved according to the actual needs of the user, achieving the goal of dynamic data cleaning and releasing more storage space for the terminal.

3.1.2. The situation of the thorough cleaning.

When the storage space release event is an extreme cleaned event, all data in the local storage medium except for the launching operation package is cleaned.

Among them, the extreme cleaned event can be understood as extreme data cleaning, that is, after cleaning, all the data retained on the local storage medium is only the launching operation package. At this time, for each local storage medium, either all the data of the target application stored in the local storage medium or all other data except for the launching operation package is cleaned.

Specifically, since the launching operation package needs to be persistently stored on the local storage medium of the terminal, the local storage medium where the launching operation package is located is usually the storage medium corresponding to the cache component with lower response priority level. Therefore, for the local storage medium with the lowest response priority level, the other data except for the launching operation package can be cleaned. For the local storage medium with other response priority levels, all the data of the target application in the local storage media can be cleaned. For example, as shown in FIG. 1, all the data of the target application in the internal memory and the first external memory can be cleaned, while only the launching operation package is retained in the second external memory, and all other data is cleaned.

When adopting this implementation method, on the one hand, the space of the local storage medium can be regularly cleaned to remove data with small number of visits and/or early time of visits from the local storage medium, so that the local storage medium can store data with large number of visits and/or recent time of visits. On the other hand, by regularly cleaning the data in the local storage medium, the occupancy rate of the local storage medium can be reduced. When cleaning the internal memory regularly, the occupancy of the internal memory can be reduced, thereby ensuring the response speed of the internal memory to other applications and improving the stability of the operating system of the terminal. On the other hand, when regularly cleaning the first external memory and the second external memory, a certain proportion of high-frequency usage data can be retained in the first external memory and the second external memory, and the storage capacity used by the first external memory and the second external memory will be reduced to the proportion specified by the user. In this way, if the user wants to download and run a new application, the released space can be used to store the corresponding data for the new application, thereby ensuring the operation of both the new application and the target application.

Certainly, when a new application initializes the multi-level cache system in the present disclosure, the user can also specify the cleaning of data belonging to the new application in the local storage medium, thereby releasing storage space for other applications and dynamically satisfying the stable operation of each application.

4.1, I/O request response process based on the multi-level cache system (corresponding to the improvement point 3).

In this embodiment, the plurality of cache components have their own response priority levels, where cache components with higher response priority levels correspond to storage media with faster response speeds. Among them, the plurality of cache components can respond to the I/O requests of the target application according to their respective response priority levels, to sequentially read or write the data corresponding to the I/O requests in their respective storage media. In this way, the cache components can respond to the write request and read request of the target application.

4.1.1, Response to the write request.

It can respond to the write request of the target application and write the data to be written to the corresponding storage medium in order of the response priority levels of the plurality of cache components from high to low.

In specific implementation, the data corresponding to the write request can be written step by step to the corresponding storage medium for the write request. In an optional example, an incremental data area can be set in any storage medium corresponding to the cache components other than the one with the highest response priority level. After writing the data to be written to the storage medium corresponding to the cache component with the highest response priority level through the cache component with the highest response priority level, the data to be written can be read out through the cache component corresponding to the incremental data area and written to the incremental data area.

For example, as shown in FIG. 1, the incremental data area can be set in the first external memory. The first cache component has the highest response priority level. The first cache component can write the data to be written to its corresponding internal memory. If the incremental data area is set in the first external memory, the second cache component reads the data to be written from the internal memory and writes it to the incremental data area. The incremental data area can mirror the directory structure of the original shard file. When writing, the data to be written is correspondingly written to the incremental shard file to which the data to be written belongs.

In another optional example, the data to be written can be written to the storage medium corresponding to the cache component with the highest response priority level in order of the response priority levels from high to low, through the cache component with the highest response priority level. And the data to be written is read from the storage medium corresponding to the cache component with the highest response priority level, and the data to be written is written to the corresponding storage medium through the cache component with the lower response priority level.

When writing the data to be written to the storage medium corresponding to the cache component with the highest response priority level, the next-level cache component of the cache component with the highest response priority level reads the data to be written from the storage medium corresponding to the cache component with the highest response priority level and writes it to its own storage medium. The cache component at a next level of the next-level cache component reads the data to be written from the storage medium corresponding to the next-level cache component and writes it to its own storage medium, and so on, achieving step by step writing of data. In this way, each storage medium can include the data corresponding to the write request of the target application.

Certainly, after writing the data corresponding to the write request to the storage medium, the data flag bit of the data can be updated, which can include "0" and "1". Among them, "0" represents cleanliness; "1" represents "dirty", indicating that data has been written.

In this case, when the data needs to be read, the data flag bit of the data to be read can be used to determine whether the data is written data. If so, the data can be read from the corresponding local storage medium. Specifically, when the data to be written is written to the incremental data area, the data can be directly read from the incremental data area. If not, the original data can be read from the local storage medium.

When using this implementation method, the data block can be written to the storage medium with the highest response priority level when writing data, and then the data to be written can be extracted from the storage medium with the highest response priority level and written to other storage media or incremental data areas, the efficiency of writing to the storage medium with the highest response priority level is significantly higher than that of writing to other storage media. Therefore, the write requests of the user can be quickly responded to, thereby optimizing the user experience.

4.1.2, Response to the read request.

Specifically, when each of the plurality of cache components have its own response priority level, they can respond to the read request of the target application, and the data corresponding to the read requests can be sequentially acquired from the corresponding storage medium through the cache components in order of the response priority levels of the plurality of cache components from high to low.

In this embodiment, it may sequentially attempt to acquire the data corresponding to the read request from the corresponding storage medium through each cache component in the order of the response priority levels from high to low. In specific implementation, it may sequentially attempt to read the required data from the plurality of storage media in order of the response priority levels from high to low.

Among them, when all the required data is read from one or more storage media, the data can be returned to the target application. When all the required data is not read from one or more storage media, a message of data read failure is returned to the target application.

Correspondingly, when sequentially attempting to read the required data from the plurality of storage media in order of the response priority levels from high to low, taking the software and hardware environment shown in FIG. 1 as an example, the first cache component corresponds to the internal memory of the terminal, the second cache component corresponds to the first external memory of the terminal, the third cache component corresponds to the second external memory of the terminal, and the fourth cache component corresponds to cloud storage medium. The specific process can be carried out according to the following steps:

firstly, acquiring data from the internal memory;
if all the data is not successfully acquired from the internal memory, acquiring the data, that is not acquired from the internal memory, from the first external memory;
if the required data is not successfully acquired from the first external memory, acquiring the data, that is not successfully acquired from the first external memory, from the second external memory; and
if the required data is not successfully acquired from the second external memory, acquiring the data, that is not successfully acquired from the second external memory, from the cloud storage medium.

From this, it can be seen that the present disclosure adopts an architecture of the multi-level cache component, which can reduce the process of data access when reading data, thereby improving the I/O response speed of the target application.

In one example, data read from the storage medium corresponding to the cache component with a lower response priority level can also be written to the storage medium corresponding to the cache component with a higher response priority level.

When using the implementation of data reading according to the response priority levels as described above, the data read from the storage medium corresponding to the cache component with the lower response priority level will inevitably not exist in the storage medium corresponding to the cache component with the higher response priority level, such as data read from the second external memory that does not exist in the first external memory and the internal memory.

Therefore, the data read from the storage medium corresponding to the cache component with the lower response priority level can be written to the storage medium corresponding to cache component with the higher response priority level. Among them, it can be written to the storage media corresponding to all cache components with the higher response priority levels, or to the storage medium corresponding to any cache component with the higher response priority level. For example, the data read from the second external memory can be written to the first external memory and the internal memory, or to the first external memory or the internal memory.

In one embodiment, as described in section 3.1.1 above, considering that the data in the first external memory corresponding to the temporary cache component (cache component corresponding to the first external memory) of the present disclosure is the data eliminated from the internal memory, the present disclosure can write the data acquired from the second external memory or the cloud storage medium to the internal memory when acquiring the data from the second external memory or the cloud storage medium. When acquiring data from the cloud storage medium, the data acquired from the cloud storage medium is written to the second external memory.

In this embodiment of the present disclosure, the data acquired from the second external memory or the cloud storage medium can be written to the internal memory. Alternatively, when the data is only acquired from the cloud storage medium, the data acquired from the cloud storage medium can be written to the internal memory and second external memory.

When adopting this implementation method, the data acquired from the storage medium with the lower response priority level can be moved to the storage medium with the higher response priority level, so that the data can be gradually moved to the storage medium with the faster response speed. Therefore, as the number of visits of the data increases, the probability of shortening the data visit process will increase, thereby improving the I/O response speed during the operation of the target application. And, on the one hand, it can ensure that the first external memory only retains the data that is eliminated from the internal memory. As the operation duration of the target application becomes longer, more and more data is eliminated from the internal memory, greatly increasing the probability of successfully reading data from both the first external memory and the internal memory. On the other hand, since data acquired from the cloud storage medium can be written to the second external memory, it can ensure that the data can be directly read from the second external memory when reading next time, reducing the visit process of data reading next time and improving the I/O response speed.

5.1, Storing the original data of the target application at the granularity of data blocks (corresponding to the improvement point 2)

5.1.1, Production of the original shard files.

As mentioned in the improvement point 2 above, while improving the I/O response speed of the target application, the production process of the original shard file has also been improved to enhance the stability of the I/O response of the target application. Which is mainly reflected in that: each storage medium stores data that supports the operation of the target application at the granularity of data blocks, and the data blocks are obtained by dividing all the original data of the target application into slices of specific size.

In specific implementation, all data blocks acquired by dividing the original data of the target application into slices of specific size can be obtained, and all data blocks can be divided into different clusters to obtain a plurality of original shard files. And the plurality of original shard files and the launching operation package are uploaded to the cloud storage medium for the target application to download and use.

Among them, each original shard file includes some data blocks from the original data of the target application. In this way, the original data from a plurality of logical files of the target application is reallocated to the original shard files. This allows for the reading and writing of corresponding data blocks from the corresponding original shard file, thereby improving the stability of I/O response. Correspondingly, in this case, if the storage medium with the highest response priority level is the internal memory, the downloaded data blocks are scattered and stored in the internal memory, while the first external memory and the second external memory of the terminal are based on the directory structure of the original shard file to store the downloaded data blocks. Among them, the downloaded data blocks are stored in the local storage medium according to the corresponding directory structure, and the resulting file is called a cache shard file. That is, the downloaded data blocks are stored correspondingly in the cache shard file. The directory structure of the cache shard files in the first external memory and the second external memory is consistent with the directory structure of the original shard files stored in the cloud storage medium.

Among them, the terminal for producing the original shard file can be another terminal, such as the terminal of the producer of the target application. When producing the original shard file, the data content in each logical file can be acquired based on the logical file of the target application. Then, according to the data content of each logical file, the amount of data can be determined, and the number of data blocks that need to be divided can be determined based on the amount of data. Afterwards, based on the determined number of data blocks, the data content of each logical file is divided into slices of specific size to obtain a plurality of data blocks. Then, the plurality of data blocks are divided into clusters by specific partitioning strategy, and the specific partitioning strategy can be specified by the creator to obtain the plurality of original shard files. The launching operation package and the plurality of original shard files are then packaged and uploaded together to the cloud storage medium for future use. In this way, all original data of the target application is retained in the cloud storage medium.

In this embodiment, the data of the target application stored in the local storage medium is initially downloaded from the cloud storage medium. It should be noted that read requests are generally performed for the plurality of data blocks, while the local storage medium stores partial data blocks of the target application. Therefore, when it needs to read all data blocks from one or more storage media, it needs to read them at the granularity of data blocks, then the read data blocks are encapsulated and returned to the target application.

Specifically, the detailed process of producing the original shard file can be found in the content described in section 5.1.5.

5.1.2, Data I/O response and data cleaning based on the original shard file.

5.1.2.1, Data writing based on the original shard file.

In the response process of the write request in section 4.1.1 above, at least one second data block corresponding to the data to be written can be sequentially written to the plurality of storage media in order of the response priority levels from high to low.

When the write request is received, it is usually necessary to update the original data, that is, rewrite the original data. In this way, at least one data block can be written to the plurality of storage media in order of the response priority levels from high to low.

Specifically, the logical file and write position corresponding to the data to be written can be determined. Based on the logical file and write position corresponding to the data to be written, at least one data block of the data to be written can be determined, and the data block can be written to each storage medium.

In one example, the data flag bit of the written data block can be updated to "1", where "1" represents "dirty". In this way, the data flag bits of the data blocks stored in each storage medium are all "1". Subsequently, when performing data cleaning, the data blocks with the data flag bits of "1" can be moved to the incremental data area.

In another example, when writing data, it is also possible to first write the data to the storage medium with the highest response priority level, and then write it to the incremental data area. Therefore, when writing the data block, the second data block can also be written only in the storage medium with the highest response priority level or the incremental data area, and the data flag bit of the data block can be synchronously updated. In this way, when reading the data block, if the data block in the internal memory is cleaned, the data block can be directly read from the incremental data area without reading from other storage media. This can improve the efficiency of reading dirty data blocks.

5.1.2.2, Data reading based on the original shard files.

In the response process of the read request in section 4.1.2 above, the data blocks required for the read request can be read from the corresponding storage medium in order of the response priority levels of the plurality of cache components from high to low, and all the read data blocks can be encapsulated and returned to the target application.

Since the original data of the target application is divided into slices of specific size and then stored in different original shard files, for a read request, the requested data generally includes a plurality of data blocks, and all required data blocks need to be read from the plurality of storage media. Correspondingly, it can sequentially attempt to read all data blocks from the plurality of storage media in order of the response priority levels from high to low. In this way, for a storage medium, in response to the read request, all data blocks required for the read request may be read from the storage medium, or some of all the required data blocks may be read.

The specific process is as follows:
- firstly, acquiring the required data block from the corresponding storage medium through the cache component with the highest response priority level; for example, reading the data blocks from the internal memory through the internal memory cache component;
- if all data blocks are not successfully acquired, the remaining data blocks that have not been acquired will be acquired from the corresponding storage medium through the next-level cache component; for example, reading out the remaining data blocks from the first external memory through the temporary cache component;
- if all remaining data blocks are not successfully acquired that is, there are still some data blocks that have not been acquired, then the cache component at a next level of the next-level cache component is used to acquire these data blocks from the corresponding storage medium, such as reading these data blocks from the second external memory through a third cache component;
- if there are still some unread data blocks in the process of acquiring these data blocks, then for these unread data blocks, the cache component at a next level of the cache components in a previous step is used to acquire them from the corresponding storage medium. For example, the fourth cache component is used to read these data blocks from the cloud storage medium until all data blocks are read out and the reading is completed, or all the storage media are traversed and the reading is completed.

It should be noted that if all data blocks are read, they can be encapsulated and returned to the target application through the cache component with the highest response priority level. As shown in FIG. 1, when there are four cache components, the data blocks read through the third cache component and the fourth cache component can be packaged by the shard file I/O splitter and uploaded to the temporary cache component. The temporary cache component then uploads the packaged data and the data blocks acquired by itself to the internal memory cache component. Afterwards, the internal memory cache component encapsulates the packaged data, the data blocks uploaded by the temporary cache component, and the data blocks acquired by itself and returns them to the target application.

After the above process, the data blocks corresponding to the read request are acquired. It can be seen that the present disclosure adopts the architecture of the multi-level cache component. When reading data, the data block is preferentially read from the storage medium with the fast response speed. This can achieve reading data from the storage medium with the fast response speed as much as possible, thereby reducing the process of data access and improving the I/O response speed of the target application.

In a specific implementation, since the original shard file stores data blocks, the data blocks are obtained by dividing the original data of the target application into slices of specific size, in practice, the target application generally indicates the data to be read through the logical file identifier, data position, and data length of the target application. In this way, the read request issued by the target application carries the logical file identifier of the target application and the range of data to be read. The read request needs to be redirected to convert it into a request that can read data blocks from the original/cached shard file on the storage medium (the original shard file is stored on the cloud storage medium, while the local storage medium stores the cached shard file), so that the converted read request can be recognized by the cache component to clarify which data block on which original shard file or cached shard file needs to be read, so as to successfully read the stored data blocks from the storage medium.

Specifically, a correspondence relationship can be established between the original data of the target application and the data blocks in the storage medium, the correspondence relationship can be understood as a data correspondence relationship. Based on this data correspondence relationship, the data block corresponding to the read request can be determined.

In specific implementation, when sequentially reading the data blocks required for the read request from the corresponding storage medium, the block unique identifier of each data block after dividing the data to be read corresponding to the read request is determined based on the data correspondence relationship in response to the read request of the target application. And the data blocks with the block unique identifiers can be sequentially read from the corresponding storage medium in order of the response priority levels of the plurality of cache components from high to low.

Specifically, each data block in all original shard files can be assigned a globally unique identifier, such as the block unique identifier, to uniquely identify a data block. In this way, the converted read request can carry the block unique identifier to clearly indicate which data block on which original shard file needs to be read.

Among them, the data correspondence relationship can be downloaded together with the launching operation package, and the one-to-one mapping relationship between the original data in the logical files of the target application and the data blocks in the original shard files is recorded in the data correspondence relationship. Among them, the original data in the logical files can be assigned an identifier in the logical file for each divided data block according to the number of data blocks. For example, if the original data in the logical file needs to be divided into ten data blocks, their identifiers in the logical file will be set for the ten data blocks, such as 1, 2, and 3. The data blocks in the original shard file have globally unique block unique identifiers, which means that the block unique identifiers of the data blocks in different original shard files are different.

For example, the target application has a total of ten logical files. Based on the data content of the ten logical files, if it is determined that 1000 data blocks need to be divided, unique block unique identifiers will be set for each of the 1000 data blocks. For example, one of the data blocks has a block unique identifier of "55', abbreviated as data block 55, which corresponds to a data block with an identifier of 3 in a logical file 4, abbreviated as data block f4b3(file_4/block_3). Then the data block 55 forms a mapping relationship with the data block f4b3 in the logical file 4, the mapping relationship is the data correspondence relationship.

After determining the block unique identifier of the data to be read in the original shard file, the read request can be converted into a read request including the block unique identifier, and then the read request can be sent to the plurality of cache components in sequence. So, the data blocks can be sequentially read from the corresponding storage medium based on this read request in order of the response priority levels of the plurality of cache components from high to low.

5.1.3 Data pre-reading based on the original shard files (corresponding to the improvement point 4).

Since the original data of the target application is divided into slices of specific size and then stored in the original shard file, the data of the target application is stored on the local storage medium at the granularity of data blocks. In one embodiment, in order to improve the response speed of the read requests from the target application, the data to be read next time by the target application can be predicted, and the data to be read can be stored in advance on the storage medium corresponding to the cache component with the highest response priority level. When the next read request hits the pre-read data, the data can be read from the storage medium corresponding to the cache component with the highest response priority level, thereby improving the response speed.

Referring to FIG. 4, a flow chart of steps of the data pre-reading according to the embodiment of the present disclosure is shown, as shown in FIG. 4, which includes the following steps:

Step S401: determining a plurality of pre-read data blocks to be read next time based on data read by a plurality of historical read requests of the target application.

In this embodiment, the data read by each I/O thread of the target application can be traced and recorded, thereby forming a data reading trajectory for each I/O thread. This reading trajectory can reflect the pattern of data reading by each I/O thread, such as whether to read data forward consecutively or swing back and forth, thus determining the pattern of data reading. Therefore, based on the read trajectory of each I/O thread, the plurality of pre-read data blocks to be read next time by the I/O thread can be determined.

Specifically, it may record the data read by each I/O thread j each time, where data read each time is composed of the plurality of data blocks. Therefore, the block unique identifier and number of data blocks read by each I/O thread each time can be determined, thus forming the data block reading trajectory of the I/O thread j.

Among them, the pattern of data reading by each I/O thread can be determined through the data block reading trajectory. For example, if the data block reading trajectory reflects that the I/O thread always swings back and forth in a small range of data block areas, for example, during the first reading, it reads the data block 3 to the data block 5; during the second reading, it reads the data block 4 to the data block 6; and during the third reading, it reads the data block 5 to the data block 7, it indicates that the data reading is swinging back and forth. Therefore, it can be predicted that three data blocks will be read next time, and the three data blocks are the data block 6 to the data block 8.

For example, during the first reading, the data block 3 to the data block 5 are read; during the second reading, the data block 6 to the data block 8 are read; and during the third reading, the data block 9 to the data block 12 are read. This indicates that data reading always moves forward consecutively. Therefore, based on the principle of predicting the maximum data range in the read history trajectory, it can be predicted that four data blocks will be read next time, which are the data block 13 to the data block 16.

Certainly, the above is only an illustrative example. In practical situations, the trajectories of data read by different I/O threads are different, and the situation is also complex. However, user operations have a certain regularity. That is to say, although the trajectories of data read by different I/O threads are different, each I/O thread still reads data with a certain regularity. By relying on this regularity, it is possible to predict the number of data blocks to be read by each I/O thread next time and the corresponding block unique identifier, thereby determining the plurality of pre-read data blocks to be read next time.

Step S402: for target data blocks not exist in the storage medium corresponding to the cache component with a highest response priority level among the plurality of pre-read data blocks, reading the target data blocks through remaining cache components from the corresponding storage medium in order of the response priority levels from high to low.

Step S403: writing the target data blocks read through remaining cache components into the storage medium corresponding to the cache component with the highest response priority level, so that when a next read request hits the plurality of pre-read data blocks, the plurality of pre-read data blocks are read from the storage medium corresponding to the cache component with the highest response priority level.

In this embodiment, after determining the plurality of pre-read data blocks to be pre-read, it can be determined whether there are the plurality of pre-read data blocks in the storage medium corresponding to the cache component with the highest response priority level. If it is determined that all of the pre-read data blocks exist in the storage medium, no operation can be performed and the next read request can be waited for. If the next read request hits the plurality of pre-read data blocks, the plurality of pre-read data blocks can be read from the storage medium.

If not all of the pre-read data blocks exist in the storage medium, for the target data blocks that do not exist in the storage medium, the target data blocks are read from the corresponding storage medium through other cache components in order of the response priority levels from high to low. Then, the read target data blocks are stored in the storage medium corresponding to the cache component with the highest response priority level. Therefore, when the next read request arrives, if the next read request hits the plurality of pre-read data blocks, the plurality of pre-read data blocks can be read from the storage medium.

In one embodiment, as shown in FIG. 1, it includes four cache components, where the first cache component is the internal memory cache component, and its corresponding storage medium is the internal memory of the terminal. The second cache component is the temporary cache component, and its corresponding storage medium is the first external memory of the terminal. Taking this example as an example, to explain how to pre-read:

among them, based on the data blocks to be read next time by the I/O thread j (j is an integer greater than or equal to 1) and the corresponding data block unique identifiers, the internal memory cache component can determine whether the data blocks to be read are all in the internal memory. If not exist, it determines the target data blocks that do not exist in the internal memory among the plurality of pre-read data blocks, encapsulates the pre-read requests for these target data blocks that do not exist in the internal memory, and sends the pre-read requests to the temporary cache component.

Then, the temporary cache component first instructs the shard file I/O splitter to read the target data block from the second external memory through the third cache component. If the target data block does not exist in the second external memory, it then instructs the shard file I/O splitter to read the target data block from the original shard file of the cloud storage medium through the fourth cache component.

After reading out the target data block, the temporary caching component can provide feedback to the internal memory cache component, and then, the internal memory cache component writes the read target data block into the internal memory. Among them, the data blocks in the internal memory are stored discretely.

In this way, when the I/O thread j issues the next read request, if the next read request hits the pre-read data blocks, the pre-read data blocks can be directly read from the internal memory. This can shorten the data access process and improve the I/O response speed. If the next read request does not hit the pre-read data blocks, it can be read in order of the response priority levels of the plurality of cache components.

When adopting this implementation method, on the one hand, because the data to be read by the target application next time is predicted in advance and placed in the storage medium with the fastest response speed in advance, the data can be directly read from the storage medium with the fastest response speed during the next reading, which improves the response speed to the target application. On the other hand, by tracing the data read trajectories of the plurality of I/O threads simultaneously and pre-reading corresponding data blocks into the internal memory for the plurality of I/O threads, the response speed of data access during the operation of the plurality of I/O thread is improved.

5.1.4, Data cleaning based on the original shard files.

Since each storage medium stores data that supports the operation of the target application at the granularity of data blocks, the data blocks are obtained by dividing all the original data of the target application into slices of specific size. Therefore, when cleaning data in local storage medium, it can also be cleaned according to the granularity of data blocks.

Specifically, when the storage space release event is a partially cleaned event, the data blocks to be cleaned in the local storage medium are cleaned, and the data blocks to be cleaned are data blocks determined based on the reading frequency and/or the most recent reading time.

When the storage space release event is an extreme cleaned event, all data blocks in the local storage medium except for the launching operation package are cleaned.

In specific implementation, the data blocks with the reading frequency less than the target frequency and/or the most recent reading time earlier than the preset reading time in the local storage medium can be cleaned, or the data blocks with the reading frequency less than the target frequency and/or the most recent reading time earlier than the preset reading time and meeting the target proportion can be cleaned. The process of cleaning the data blocks from the local storage medium can be referred to contents described in sections 3.1.1 and 3.1.2 above.

Among them, in the case of cleaning according to the target proportion, taking the cleaning of data blocks in the internal memory as an example, when determining the data blocks to be cleaned in the internal memory, a doubly linked list can be maintained in the internal memory cache component. The header of the doubly linked list stores the block unique identifier of the "most recently accessed" data blocks, and the tail stores the block unique identifier of the "longest unvisited" data blocks. When a certain data block is hit by the read request, the block unique identifier of the corresponding data block is taken out from the current position of the doubly linked list and placed in the header of the linked list. In this way, the block unique identifier closer to the chain header indicates that the data block has been accessed more recently. When the internal memory needs to be cleaned, the data blocks corresponding to a plurality of block unique identifiers around the tail of the doubly linked list can be determined as the data blocks to be cleaned, and the proportion of the data blocks to be cleaned to all data in the doubly linked list is the target proportion. If the target proportion is 40%, then 40% of the infrequently accessed data will be cleaned.

When using this implementation method, data cleaning can be carried out from a more detailed perspective, making the data cleaning more thorough, and accurately achieving the desired cleaning proportion for the users. The released storage space can better meet the needs of the users.

5.1.5, Detailed process of producing the original shard files.

Referring to FIG. 5, a flow chart of the steps for producing the original shard file is shown, as shown in FIG. 5, which can specifically include the following steps:

Step S501: based on the data content in the logical file of the target application, determining the number of data blocks to be divided, and establishing a data correspondence relationship based on the number of data blocks to be divided.

Step S502: in response to file production requests initiated for the target application, creating a plurality of empty original shard files based on the data correspondence relationship. Among them, each original shard file corresponds to a plurality of data blocks in a plurality of logical files described in the data correspondence relationship. The number of data blocks allocated in each original shard file is specified by the creator of the original mirror-image package.

Step S503: reading the data content of each logical file of the target application, and writing the read data content in blocks into the corresponding original shard files based on the data correspondence relationship.

After writing, the plurality of original shard files, cache stack description files, and launching operation package can be packaged and uploaded to the cloud storage medium together.

Among them, taking the software and hardware environment shown in FIG. 1 as an example, an exemplary explanation is given for the production of the original shard files in the present disclosure:

firstly, the file block manager prepares the data correspondence relationship in advance. During this process, the file block manager can read and display the data content and attributes of each logical file of the target application. Then, it determines the data block that each data content belongs to and the number of data blocks allocated to each original shard file. Afterwards, the file block manager generates the data correspondence relationships based on the divided data blocks and the number of data blocks allocated to each original shard file.

When initializing the file block manager and the plurality of cache components, a data pathway between the file block manager and the third cache component is established. When it needs to produce the original shard file, the original data in the logical file of the target application is written to the empty original shard file in the local second external memory. Therefore, the data pathway can be established between the file block manager and the third cache component (the cache component corresponding to the second external memory). Through this data pathway, the file block manager can divide the original data read from the logical file of the target application into slices of specific size and write them to the empty original shard file in the second external memory.

Specifically, during writing, as the file block manager has pre-produced the data correspondence relationships, when reading the data content of the target application, the logical file identifier to which the data content belongs can be determined. Then, through the data correspondence relationship, the original shard file to which the data content needs to be written and the globally unique block unique identifier assigned to the data block can be determined, and the read data content can be written in blocks to the corresponding original shard file through this data pathway.

After all logical files/directory structures have been enumerated and data blocks read from them have been written to the original shard files, a configuration file (such as the cache stack description file) for the target application is created and stored in the directory structure with the same level as the original shard file, packaged together into the original mirror-image package. The original mirror-image package and the launching operation package are then packaged and uploaded to the OSS (object storage service) or a large-scale distributed file system of the source station server, and then preloaded to cache servers in different regions through the CDN system, thus achieving the storage of the original data of the target application in multiple data sources.

In one embodiment, an implementation method for the data correspondence relationship is provided, in which the data correspondence relationship can be established through relationship table items. The specific process is as follows:

firstly, a nodex table is created and the attribute information of each logical file is written into the corresponding field of the nodex table. Among them, the attribute information includes the file identifier of the logical file.

Next, based on the data content of each logical file, the number of data blocks contained in each logical file is determined, and a blocks table is created based on the total number of the data blocks of all the logical files. The blocks table is assigned with multiple unique identifiers (as the block unique identifier described above), and each unique identifier uniquely represents one data block. Among them, the number of table items in the blocks table is the same as the total number of data blocks in the target application. Each table item corresponds to one data block, and the logical file identifier and the block identifier of the logical file can be written into the corresponding field of one table item in the blocks table.

Afterwards, the file identifier of the logical file and the block identifier of the logical file is written to the table item where the corresponding block unique identifier in the blocks table is located. And the blocks table and nodex table that are written completely are integrated into a data block description table, which is the data correspondence relationship.

In this embodiment, the file block manager can create a nodex table item for the attribute information of each logical file/directory, and then write the attribute information of each logical file/directory into the corresponding field of this nodex table item, thereby obtaining the nodex table composed of multiple nodex table items. Among them, the attribute information of the logical files/directories includes logical file identifier and information such as types, sizes, creation, modification, and access time of the logical file.

Referring to FIG. 6, a schematic diagram of the data block description table according to the present disclosure is shown, including the nodex table and the blocks table. The blocks table is a table composed of three columns on the left side of FIG. 6, and the nodex table is a table composed of nine columns on the right side of FIG. 6. As shown in FIG. 6, each table item in the nodex table includes relevant attribute information for each logical file. NodeID represents the globally unique logical file identifier, and is used to index the corresponding attributes (file attribute information, data block distribution information) of the logical file in the blocks table and the nodex table. ParentID represents the NodeID of the parent logical file, and other fields are regular attributes.

The dblkid in the blocks table represents the block unique identifier of the data blocks in the original shard file, while the blockid represents the internal block identifier of the logical file (counting up from the 0 offset address till the end of the logical file), c/a/mtime refers to the time of creation/access/modification, and in practice, the modification time can be represented by a timestamp (the timestamp is not specifically shown in FIG. 6, represented by *), and valid/allocsize represents the valid size and the allocated capacity size of the logic file (in bytes, which can be used to determine the number of data blocks).

In this way, when the read request carries the logical file identifier and the data block identifier, it can search for the data block in the original shard file corresponding to the read request based on the blocks table.

Certainly, in some embodiments, the file block manager also provides corresponding processes for creating, deleting, opening, closing, data reading, and data writing of the logical files.

Among them, the process of creating the logical file is to: insert a table item into the nodex table and set the nodeid of the table item to the nodeid of the logical file. Other attributes are set according to the file type, size, creation/modification/access time, user (group) affiliation, and other information (file descriptors in the internal memory for describing working state of the logical file are usually created when opening the file and destroyed when closing the file).

The process of deleting the logical files is to: set the nodeid&blockid of all table items in the blocks table that are equal to the nodeid of the logical file to 0xffffffff, while keeping dblkid unchanged, and search for the table item corresponding to the nodeid of the logical file in the nodex table and delete it.

The process of opening the logical file is to: create a file descriptor for the logical file in the internal memory, and then search for the nodex table item corresponding to the nodeid of the logical file in the nodex table. If the nodex table item cannot be found, the file descriptor is destroyed and it returns a failure. If the nodex table item is found, the relevant attributes are read into the file descriptor, a virtual file handle corresponding to the file descriptor is created, and then the virtual file handle pointing to the file descriptor is returned to the application.

The process of closing the logical file is to: write the attribute information in the file descriptor of the logical file into the nodex table item corresponding to the nodeid of the logical file, destroy the file descriptor in the internal memory, and delete the virtual file handle pointing to the file descriptor.

The process of data writing of the logical files is to: firstly, allocate writable data block table items matching the number of data blocks for this write request in the blocks table, and search for the table items with nodeid&blockid being 0xffffffff (indicating idle). After searching for enough number of the table items, the nodeid of the relevant table items is updated to the nodeid of the corresponding logical file, and the blockid is updated to the blockid of the data block corresponding to the logical file. Then the write request is converted into a dblkid write request and prioritize sending it to the internal memory cache component to complete the write request.

The process of data reading of the logical files is to: firstly, search for the relevant table items corresponding to the nodeid of the logical file in the blocks table; and then, determine the dblkid based on the blockid of the read request; finally, convert the read request into a dblkid read request and prioritize sending it to the internal memory cache component to complete the read request.

6.1, The exemplary introduction of the scalable cache processing method for the application according to the present disclosure.

A brief exemplary description of the scalable cache processing method for the application according to the present disclosure will be given below in the software and hardware environment shown in FIG. 1.

Firstly, the producer of the target application or other terminals with production conditions can follow the process described in section 5.1.4 to create the launching operation package and original mirror-image package, and upload the cache stack description file separately (which may not be encapsulated in the original mirror-image package). This cache stack description file can have different implementations of cache stack description file for terminals with different performance configurations.

When the terminal needs to download and install the target application, it uploads the identifier of the target application and the performance parameters of the terminal to the server. Then, it can receive the launching operation package and corresponding cache stack description file issued by the server, and download data blocks of the original mirror-image package.

Next, the terminal launches the target application based on the launching operation package, and then initializes the multi-level cache system shown in FIG. 1 based on the cache stack description file. Here, the plurality of cache components being four cache components as shown in FIG. 1 are taken as an example.

Afterwards, the terminal users begin to use the target application. As the original data of the target application is converted into multiple original shard files and stored on the cloud storage medium, after the target application is launched, the required data can be acquired from the partially downloaded data blocks on the local storage media of the terminal or from the original mirror-image package of the cloud storage medium to support the operation of the target application. Due to the minimal amount of data included in the launching operation package, the target application can be quickly downloaded, installed and launched, and the data required for the target application to operate can be obtained from the original mirror-image package or locally downloaded data to support the operation of the application, enabling the target application to be used without exceptions or bugs, optimizing the user experience.

With the usage of the target application, each storage medium has the data of the target application and the data is accumulated more and more. Therefore, the data of the target application stored in the local storage media (the internal memory, the first external memory, and the second external memory) of the terminal can be cleaned. Specifically, one or more of the local storage media of the target application can be cleaned. During cleaning, the cleaning proportion for each storage medium can also be specified, which can be any proportion. In addition, the proportion is automatically generated by the application manager based on the performance configuration of the current operating system and the hardware platform, or can be specified by the user.

When the extreme cleaning is required, all data in the internal memory, the first external memory, and the second external memory except for the launching operation package are cleaned. As a result, a huge storage space has been released, thus providing support for installing other applications and storing other data on the terminal.

In summary, the technical solution of the embodiment of the present disclosure has the following advantages:

(1) it can help the terminals to operate and install more applications.

Due to the plurality of cache components of the terminal, data belonging to the target application can be periodically cleaned from the corresponding storage medium, to release more storage space for the storage medium, to store data of other applications and other multimedia data. This allows the terminal to operate and install more applications and store more data.

(2) It improves the I/O response speed of the target application.

On the one hand, when the target application sends the read request, it can prioritize reading data from the storage medium with the fast response speed, such as the internal memory, and returning it to the target application. When data cannot be read from the internal memory, the data can also be read from the storage medium with the secondary fast response speed, such as the first external memory, and returned to the target application. Therefore, when reading data, the data is read from the corresponding storage medium in order of the response speeds from fast to slow, thereby improving the I/O response speed of the target application.

On the other hand, based on the historical trajectory of data reading of the target application, it predicts the data blocks and the number of data blocks that the target application will read next time, so that the predicted data blocks can be written into the internal memory from the storage medium other than the internal memory in advance, so that the data blocks can be directly read from the internal memory during the next reading, thereby helping to further improve the I/O response speed of the target application.

(3) It improves the I/O response stability of the target application.

Due to the original data of the target application is stored in blocks according to the granularity of data blocks, the plurality of original shard files are obtained, each of the plurality of original shard files includes some data blocks of the original data of the target application. In this way, the original data of the plurality of logical files of the target application is reallocated to the plurality of original shard files. This allows for the reading and writing of corresponding data blocks from the corresponding original shard files when reading and writing data without allocating a huge number of file handles exceeding the upper limit of the system, thereby improving the stability of I/O response.

Based on the same inventive concept, the present disclosure also provides a data processing apparatus. Referring to FIG. 7, a structural block diagram of the data processing apparatus is disclosed, which may include the following modules:

an initialization module 701 configured for launching a target application based on a launching operation package of the target application, and initializing a plurality of cache components corresponding to the target application, wherein each of the plurality of cache components corresponds to a storage medium, and the storage medium stores data that supports operation of the target application;

a cleaning module 702 configured for, in response to a storage space release event on a terminal, cleaning data in a local storage medium of the terminal through a corresponding cache component, wherein all data retained in the local storage medium after cleaning is at least data in the launching operation package, to at least ensure that the target application is capable to be launched successfully; and a response module 703 configured for, in response to a read request of the target application, acquiring data corresponding to the read request from a cloud storage medium and/or the local storage medium through the corresponding cache component, to support the operation of the target application, wherein the cloud storage medium stores original data that supports the operation of the target application.

Optionally, the cleaning module 702 includes:

a first cleaning unit configured for, when the storage space release event is a partially cleaned event, cleaning data to be cleaned in the local storage medium, wherein the data to be cleaned is data determined based on a reading frequency and/or a most recent reading time; and a second cleaning unit configured for, when the storage space release event is an extreme cleaned event, cleaning all data in the local storage medium except for the launching operation package.

Optionally, the apparatus further includes:

a first writing module configured for, when the local storage medium includes an internal memory, writing data cleaned from the internal memory to a corresponding local storage medium with the response priority level lower than the internal memory; and a second writing module configured for, for other local storage media except for the internal memory, writing data with a target feature cleaned from the other local storage media to an incremental data area, wherein the target feature represents that a data block is the data written by the target application.

Optionally, the initialization module 701 includes:

a parameter acquisition unit configured for acquiring a performance configuration parameter of the terminal, wherein the performance configuration parameter includes a version identifier of an operating system of the terminal and/or a current performance configuration parameter of an internal memory of the terminal; and an initialization unit configured for initializing the plurality of cache components based on the performance configuration parameter, wherein a number of the plurality of cache components is adapted to the performance configuration parameter.

Optionally, the initialization unit includes:

a first initialization subunit configured for, when it is determined that the internal memory and/or the operating system of the terminal satisfy a target condition based on the performance configuration parameter, initializing cache components respectively corresponding to a plurality of external memories and the internal memory of the terminal; and a second initialization subunit configured for, when it is determined that the internal memory and/or the operating system of the terminal do not satisfy the target condition based on the performance configuration parameter, initializing the cache components respectively corresponding to the plurality of external memories.

Optionally, the apparatus further includes:

a system parameter acquisition module configured for acquiring an operating system parameter of the terminal, wherein the operating system parameter is used for indicating an operating system version on the terminal; and an interface layer initialization module configured for, based on the operating system parameter, creating an interface layer corresponding to the target application, wherein the interface layer includes a file system model, a sandbox model or a file interface model;

wherein the interface layer is used for receiving an input/output (I/O) request sent by the target application and the storage space release event.

Optionally, each of the plurality of cache components has a response priority level, the cache component with a higher response priority level corresponds to the storage medium with a faster response speed, and the apparatus further includes at least one of followings:

a first order writing module configured for, in response to a write request of the target application, writing data to be written to a corresponding storage medium in order of the response priority levels of the plurality of cache components from high to low;

an order read module configured for, in response to the read request of the target application, acquiring data corresponding to the read request from the corresponding storage medium through the cache component in order of the response priority levels of the plurality of cache components from high to low; and a second order writing module configured for writing data read from the storage medium corresponding to the cache component with a low response priority level to the storage medium corresponding to the cache component with a high response priority level.

Optionally, the first order writing module includes:

a first writing unit configured for, in order of the response priority levels from high to low, writing the data to be written to the storage medium corresponding to the cache component with a highest response priority level through the cache component with the highest response priority level; and a second writing unit configured for, reading the data to be written from the storage medium corresponding to the cache component with the highest response priority level, and writing the data to be written to the corresponding storage medium through the cache component with the low response priority level.

Optionally, each storage medium stores the data that supports the operation of the target application at granularity of a data block, the data block is obtained by dividing original data of the target application into slices of specific size, and the apparatus further includes:
a data block reading module configured for, in response to the read request of the target application, reading the data block required by the read request from a corresponding storage medium in order of the response priority levels of the plurality of cache components from high to low; and
a data block encapsulating module configured for encapsulating all data blocks read from all the cache components and returning to the target application.

Optionally, each storage medium stores the data that supports the operation of the target application at granularity of a data block, the data block is obtained by dividing original data of the target application into slices of specific size, and the apparatus further includes:
a pre-read data block determination module configured for determining a plurality of pre-read data blocks to be read next time based on data read by a plurality of historical read requests of the target application;
a pre-read data block acquisition module configured for, for target data blocks not exist in the storage medium corresponding to the cache component with a highest response priority level among the plurality of pre-read data blocks, reading the target data blocks through remaining cache components from the corresponding storage medium in order of the response priority levels from high to low; and
a pre-read data block writing module configured for writing the target data blocks read through remaining cache components into the storage medium corresponding to the cache component with the highest response priority level, so that when a next read request hits the plurality of pre-read data blocks, the plurality of pre-read data blocks are read from the storage medium corresponding to the cache component with the highest response priority level.

Optionally, the data block reading module includes:
a block unique identifier determination unit configured for, in response to the read request of the target application, determining a block unique identifier of each data block required by the read request based on a data correspondence relationship, wherein the data correspondence relationship is used for representing a correspondence relationship between the original data and the data block in the storage medium; and
a data block reading unit configured for reading a data block with the block unique identifier from the corresponding storage medium in order of the response priority levels of the plurality of cache components from high to low.

Optionally, the apparatus further includes:
a data dividing module configured for, for all data blocks obtained by dividing the original data of the target application into slices of specific size, dividing all the data blocks into different original shard files to obtain a plurality of original shard files; and
a data uploading module configured for uploading the plurality of original shard files and the launching operation package to the cloud storage medium for the target application to download and use.

Optionally, the apparatus further includes:
an interface component creation module configured for creating a plurality of interface components between the cache component and the cloud storage medium that correspond, wherein the plurality of interface components includes in order of response priority levels from high to low: a content delivery network CDN interface component, a peer-to-peer transmission P2P interface component and a source station interface component; and
a data download module configured for, when reading data from the cloud storage medium, acquiring corresponding data from the cloud storage medium through the plurality of interface components in order of the response priority levels of the plurality of interface components from high to low.

It should be noted that the apparatus embodiments are similar to the method embodiments, so the description is relatively simple. For relevant information, please refer to the method embodiments.

The embodiment of the present disclosure also discloses an electronic device including a memory, a processor, and a computer program stored on the memory and executable on the processor. When the processor executes, it implements the scalable cache processing method for the application described in the present disclosure.

The embodiment of the present disclosure also discloses a computer-readable storage medium, which stores a computer program that enables a processor to execute the scalable cache processing method for the application described in the present disclosure.

The embodiment of the present disclosure also discloses a computer program product, including a computer program/instruction that, when executed by a processor, implements the scalable cache processing method for the application described in the present disclosure.

For the device embodiments, due to its basic similarity with the method embodiments, the description is relatively simple. For relevant information, please refer to the partial explanation of the method embodiments.

The various embodiments in this specification are described in a progressive manner, with each embodiment emphasizing its differences from other embodiments. The same and similar parts between the various embodiments can be referred to each other.

Persons skilled in the art should understand that the embodiments of the present disclosure can be provided as methods, devices, or computer program products. Therefore, the embodiments of the present disclosure may take the form of fully hardware embodiments, fully software embodiments, or embodiments combining software and hardware aspects. Moreover, the embodiments of the present disclosure may take the form of a computer program product implemented on one or more computer usable storage media (including but not limited to disk storage, CD-ROM, optical storage, etc.) containing computer usable program code.

The embodiments of the present disclosure are described with reference to the flow chart and/or block diagram of the method, terminal device (system), and computer program product according to the embodiments of the present disclosure. It should be understood that each process and/or block in the flow chart and/or block diagram, as well as the combination of processes and/or blocks in the flow chart and/or block diagram, can be implemented by computer program instructions. These computer program instructions can be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flow chart and/or one or more boxes in the block diagram.

These computer program instructions can also be stored in computer-readable memory that can guide a computer or other programmable data processing terminal device to operate in a specific manner, such that the instructions stored in the computer-readable memory generate a manufactured product including instruction devices that implement the functions specified in a flow chart or multiple flow charts and/or a block diagram or multiple boxes.

These computer program instructions can also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flowchart and/or one or more boxes in the block diagram.

Although preferred embodiments of the present disclosure have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present disclosure.

Finally, it should be noted that in this specification, relational terms such as first and second are only used to distinguish one entity or operation from another, and do not necessarily require or imply any actual relationship or order between these entities or operations. Moreover, the terms "including", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element defined by the statement "including a . . . " does not exclude the existence of other identical elements in the process, method, item, or terminal device that includes the element in question.

The above provides a detailed introduction to the scalable cache processing method and apparatus for the application, device, medium, and product provided in the present disclosure. Specific examples are used in this specification to explain the principles and implementation methods of the present disclosure. The above embodiments are only used to help understand the method and core idea of the present disclosure. Meanwhile, for persons skilled in the art, there may be changes in the specific implementation and application scope based on the ideas of the present disclosure. In summary, the content of this specification should not be understood as limiting the present disclosure.

After considering the specification and practicing the invention disclosed herein, persons skilled in the art will easily come up with other implementation solutions of the present disclosure. The present disclosure is intended to cover any variations, uses, or adaptive changes of the present disclosure that follow the general principles of the present disclosure and include common knowledge or customary technical means in the art that are not disclosed in this disclosure. The specification and embodiments are only considered exemplary, and the true scope and spirit of the present disclosure are indicated by the following claims.

It should be understood that this disclosure is not limited to the precise structure described above and shown in the accompanying drawings, and various modifications and changes can be made without departing from its scope. The scope of the present disclosure is limited only by the appended claims.

The term "one embodiment", "embodiment" or "one or more embodiments" referred to in this specification means that specific features, structures or characteristics described in conjunction with the embodiments are included in at least one embodiment of the present disclosure. Furthermore, please note that the word "in one embodiment" may not necessarily refer to the same embodiment.

In the specification provided here, a large number of specific details are explained. However, it can be understood that the embodiments of the present disclosure can be practiced without these specific details. In some examples, well-known methods, structures, and techniques are not shown in detail to avoid blurring the understanding of this specification.

In the claims, any reference symbols located between parentheses should not be constructed as limitations on the claims. The word "comprising" does not exclude the existence of elements or steps that are not listed in the claims. The word "a/an" or "one" before the component does not exclude the existence of multiple such components. The present disclosure can be implemented by means of hardware including several different components and by means of appropriately programmed computers. In the unit claims listing several devices, several of these devices may be specifically embodied through the same hardware item. The use of words such as first, second, and third does not indicate any order. These words can be interpreted as names.

Finally, it should be noted that the above embodiments are only used to illustrate the technical solution and not to limit it of the present disclosure. Although the present disclosure has been described in detail with reference to the aforementioned embodiments, those skilled in the art should understand that they can still modify the technical solutions described in the aforementioned embodiments, or equivalently replace some of the technical features. And these modifications or substitutions do not depart from the essence and scope of the corresponding technical solutions disclosed in the present disclosure.

The invention claimed is:

1. A scalable cache processing method for an application, comprising:
    launching a target application based on a launching operation package of the target application, and initializing a plurality of cache components corresponding to the target application, wherein each of the plurality of cache components corresponds to a storage medium, and the storage medium stores data that supports operation of the target application;
    in response to a storage space release event on a terminal, cleaning data in a local storage medium of the terminal through a corresponding cache component, wherein all data retained in the local storage medium after cleaning is at least data in the launching operation package, to at least ensure that the target application is capable to be launched successfully; and in response to a read request of the target application, acquiring data corresponding to the read request from a cloud storage medium and/or the local storage medium through the corresponding cache component, to support the operation of the target application, wherein the cloud storage medium stores original data that supports the operation of the target application.

2. The scalable cache processing method according to claim 1, wherein in response to the storage space release event on the terminal, cleaning the data in the local storage medium of the terminal through the corresponding cache component, comprises:

when the storage space release event is a partially cleaned event, cleaning data to be cleaned in the local storage medium, wherein the data to be cleaned is data determined based on a reading frequency and/or a most recent reading time; and when the storage space release event is an extreme cleaned event, cleaning all data in the local storage medium except for the launching operation package.

3. The scalable cache processing method according to claim 2, wherein each of the plurality of cache components has a response priority level, when the storage space release event is a partially cleaned event, the method further comprises:

when the local storage medium comprises an internal memory, writing data cleaned from the internal memory to a corresponding local storage medium with the response priority level lower than the internal memory; and for other local storage media except for the internal memory, writing data with a target feature cleaned from the other local storage media to an incremental data area, wherein the target feature represents that a data block is the data written by the target application.

4. The scalable cache processing method according to claim 1, wherein initializing the plurality of cache components corresponding to the target application comprises:

acquiring a performance configuration parameter of the terminal, wherein the performance configuration parameter comprises a version identifier of an operating system of the terminal and/or a current performance configuration parameter of an internal memory of the terminal; and initializing the plurality of cache components based on the performance configuration parameter, wherein a number of the plurality of cache components is adapted to the performance configuration parameter.

5. The scalable cache processing method according to claim 4, wherein initializing the plurality of cache components based on the performance configuration parameter comprises:

when it is determined that the internal memory and/or the operating system of the terminal satisfy a target condition based on the performance configuration parameter, initializing cache components respectively corresponding to a plurality of external memories and the internal memory of the terminal; and when it is determined that the internal memory and/or the operating system of the terminal do not satisfy the target condition based on the performance configuration parameter, initializing the cache components respectively corresponding to the plurality of external memories.

6. The scalable cache processing method according to claim 1, wherein the scalable cache processing method further comprises:

acquiring an operating system parameter of the terminal, wherein the operating system parameter is used for indicating an operating system version on the terminal; and based on the operating system parameter, creating an interface layer corresponding to the target application, wherein the interface layer comprises a file system model, a sandbox model or a file interface model;

wherein the interface layer is used for receiving an input/output (I/O) request sent by the target application and the storage space release event.

7. The scalable cache processing method according to claim 1, wherein each of the plurality of cache components has a response priority level, the cache component with a higher response priority level corresponds to the storage medium with a faster response speed, and the method further comprises at least one of followings:

in response to a write request of the target application, writing data to be written to a corresponding storage medium in order of the response priority levels of the plurality of cache components from high to low;

in response to the read request of the target application, acquiring data corresponding to the read request from the corresponding storage medium through the cache component in order of the response priority levels of the plurality of cache components from high to low; and writing data read from the storage medium corresponding to the cache component with a low response priority level to the storage medium corresponding to the cache component with a high response priority level.

8. The scalable cache processing method according to claim 7, wherein writing the data to be written to the corresponding storage medium in order of the response priority levels of the plurality of cache components from high to low comprises:

in order of the response priority levels from high to low, writing the data to be written to the storage medium corresponding to the cache component with a highest response priority level through the cache component with the highest response priority level; and reading the data to be written from the storage medium corresponding to the cache component with the highest response priority level, and writing the data to be written to the corresponding storage medium through the cache component with the low response priority level.

9. The scalable cache processing method according to claim 1, wherein each storage medium stores the data that supports the operation of the target application at granularity of a data block, the data block is obtained by dividing original data of the target application into slices of specific size, and the method further comprises:

in response to the read request of the target application, reading the data block required by the read request from a corresponding storage medium in order of the response priority levels of the plurality of cache components from high to low; and encapsulating all data blocks read and returning to the target application.

10. The scalable cache processing method according to claim 9, wherein in response to the read request of the target application, reading the data block required by the read request from the corresponding storage medium in order of the response priority levels of the plurality of cache components from high to low, comprises:

in response to the read request of the target application, determining a block unique identifier of each data block required by the read request based on a data correspondence relationship, wherein the data correspondence relationship is used for representing a correspondence relationship between the original data and the data block in the storage medium; and reading a data block with the block unique identifier from the corresponding storage medium in order of the response priority levels of the plurality of cache components from high to low.

11. The scalable cache processing method according to claim 9, wherein before launching the target application based on the launching operation package of the target application, the method further comprises:

for all data blocks obtained by dividing the original data of the target application into slices of specific size, dividing all the data blocks to a plurality of original shard files; and uploading the plurality of original shard files and the launching operation package to the cloud storage medium for the target application to download and use.

12. The scalable cache processing method according to claim 1, wherein each storage medium stores the data that supports the operation of the target application at granularity of a data block, the data block is obtained by dividing original data of the target application into slices of specific size, and the method further comprises:

determining a plurality of pre-read data blocks to be read next time based on data read by a plurality of historical read requests of the target application;

for target data blocks not exist in the storage medium corresponding to the cache component with a highest response priority level among the plurality of pre-read data blocks, reading the target data blocks through remaining cache components from the corresponding storage medium in order of the response priority levels from high to low; and writing the target data blocks read through remaining cache components into the storage medium corresponding to the cache component with the highest response priority level, so that when a next read request hits the plurality of pre-read data blocks, the plurality of pre-read data blocks are read from the storage medium corresponding to the cache component with the highest response priority level.

13. The scalable cache processing method according to claim 1, wherein the scalable cache processing method further comprises:

creating a plurality of interface components between the cache component and the cloud storage medium that correspond, wherein the plurality of interface components comprises in order of response priority levels from high to low: a content delivery network CDN interface component, a peer-to-peer transmission P2P interface component and a source station interface component; and when reading data from the cloud storage medium, acquiring corresponding data from the cloud storage medium through the plurality of interface components in order of the response priority levels of the plurality of interface components from high to low.

14. An electronic device, comprising a memory, a processor, and a computer program stored on the memory and executable on the processor, wherein the processor, when executed, implements a scalable cache processing method for an application, the scalable cache processing method comprising:

launching a target application based on a launching operation package of the target application, and initializing a plurality of cache components corresponding to the target application, wherein each of the plurality of cache components corresponds to a storage medium, and the storage medium stores data that supports operation of the target application;

in response to a storage space release event on a terminal, cleaning data in a local storage medium of the terminal through a corresponding cache component, wherein all data retained in the local storage medium after cleaning is at least data in the launching operation package, to at least ensure that the target application is capable to be launched successfully; and in response to a read request of the target application, acquiring data corresponding to the read request from a cloud storage medium and/or the local storage medium through the corresponding cache component, to support the operation of the target application, wherein the cloud storage medium stores original data that supports the operation of the target application.

15. The electronic device according to claim 14, wherein the operation of, in response to the storage space release event on the terminal, cleaning the data in the local storage medium of the terminal through the corresponding cache component, comprises:

when the storage space release event is a partially cleaned event, cleaning data to be cleaned in the local storage medium, wherein the data to be cleaned is data determined based on a reading frequency and/or a most recent reading time; and when the storage space release event is an extreme cleaned event, cleaning all data in the local storage medium except for the launching operation package.

16. The electronic device according to claim 15, wherein each of the plurality of cache components has a response priority level, when the storage space release event is a partially cleaned event, the operations further comprise:

when the local storage medium comprises an internal memory, writing data cleaned from the internal memory to a corresponding local storage medium with the response priority level lower than the internal memory; and for other local storage media except for the internal memory, writing data with a target feature cleaned from the other local storage media to an incremental data area, wherein the target feature represents that a data block is the data written by the target application.

17. The electronic device according to claim 14, wherein the operation of initializing the plurality of cache components corresponding to the target application comprises:

acquiring a performance configuration parameter of the terminal, wherein the performance configuration parameter comprises a version identifier of an operating system of the terminal and/or a current performance configuration parameter of an internal memory of the terminal; and initializing the plurality of cache components based on the performance configuration parameter, wherein a number of the plurality of cache components is adapted to the performance configuration parameter.

18. A non-transitory computer-readable storage medium, storing a computer program which enables a processor to execute operations of a scalable cache processing method for an application, the scalable cache processing method comprising:

launching a target application based on a launching operation package of the target application, and initializing a plurality of cache components corresponding to the target application, wherein each of the plurality of cache components corresponds to a storage medium, and the storage medium stores data that supports operation of the target application;

in response to a storage space release event on a terminal, cleaning data in a local storage medium of the terminal through a corresponding cache component, wherein all data retained in the local storage medium after cleaning is at least data in the launching operation package, to at least ensure that the target application is capable to be launched successfully; and in response to a read request of the target application, acquiring data corresponding to the read request from a cloud storage medium and/or the local storage medium through the corresponding cache component, to support the operation of the target application, wherein the cloud storage medium stores original data that supports the operation of the target application.

19. The non-transitory computer-readable storage medium according to claim 18, wherein the operation of, in response to the storage space release event on the terminal, cleaning the data in the local storage medium of the terminal through the corresponding cache component, comprises:

when the storage space release event is a partially cleaned event, cleaning data to be cleaned in the local storage medium, wherein the data to be cleaned is data determined based on a reading frequency and/or a most recent reading time; and when the storage space release event is an extreme cleaned event, cleaning all data in the local storage medium except for the launching operation package.

20. The non-transitory computer-readable storage medium according to claim 19, wherein each of the plurality of cache components has a response priority level, when the storage space release event is a partially cleaned event, the operations further comprise:

when the local storage medium comprises an internal memory, writing data cleaned from the internal memory to a corresponding local storage medium with the response priority level lower than the internal memory; and for other local storage media except for the internal memory, writing data with a target feature cleaned from the other local storage media to an incremental data area, wherein the target feature represents that a data block is the data written by the target application.

* * * * *